(12) United States Patent
Martirosyan et al.

(10) Patent No.: US 11,126,182 B2
(45) Date of Patent: Sep. 21, 2021

(54) UNMANNED AERIAL IMAGE CAPTURE PLATFORM

(71) Applicant: SKYDIO, INC., Redwood City, CA (US)

(72) Inventors: Hayk Martirosyan, San Francisco, CA (US); Adam Bry, Redwood City, CA (US); Matthew Donahoe, Redwood City, CA (US); Abraham Bachrach, Redwood City, CA (US); Justin Michael Sadowski, Menlo Park, CA (US)

(73) Assignee: Skydio, Inc., Redwood City, CA (US)

( * ) Notice: Subject to any disclaimer, the term of this patent is extended or adjusted under 35 U.S.C. 154(b) by 0 days.

(21) Appl. No.: 16/723,549

(22) Filed: Dec. 20, 2019

(65) Prior Publication Data

US 2020/0125101 A1 Apr. 23, 2020

Related U.S. Application Data

(63) Continuation of application No. 15/235,513, filed on Aug. 12, 2016, now Pat. No. 10,520,943.

(51) Int. Cl.
*G05D 1/00* (2006.01)
*B64C 39/02* (2006.01)
*B64D 47/08* (2006.01)
*G06T 7/292* (2017.01)
*G05D 1/10* (2006.01)

(52) U.S. Cl.
CPC ......... *G05D 1/0094* (2013.01); *B64C 39/024* (2013.01); *B64D 47/08* (2013.01); *G05D 1/106* (2019.05); *G06T 7/292* (2017.01); *B64C 2201/027* (2013.01); *B64C 2201/127* (2013.01); *B64C 2201/141* (2013.01); *G06T 2207/10021* (2013.01); *G06T 2207/10032* (2013.01); *G06T 2207/30252* (2013.01)

(58) Field of Classification Search
None
See application file for complete search history.

(56) References Cited

U.S. PATENT DOCUMENTS

| 5,211,172 A | 5/1993 | Mcguane et al. |
| 6,744,397 B1 | 6/2004 | Hager et al. |
| 7,363,157 B1 | 4/2008 | Hanna et al. |

(Continued)

OTHER PUBLICATIONS

M. Quigley, M. A. Goodrich, S. Griffiths, A. Eldredge and R. W. Beard, "Target Acquisition, Localization, and Surveillance Using a Fixed-Wing Mini-UAV and Gimbaled Camera," Proceedings of the 2005 IEEE International Conference on Robotics and Automation , Barcelona, Spain, 2005, pp. 2600-2605 (Year: 2005).*

(Continued)

*Primary Examiner* — Stefan Gadomski

(57) ABSTRACT

Methods and systems are disclosed for an unmanned aerial vehicle (UAV) configured to autonomously navigate a physical environment while capturing images of the physical environment. In some embodiments, the motion of the UAV and a subject in the physical environment may be estimated based in part on images of the physical environment captured by the UAV. In response to estimating the motions, image capture by the UAV may be dynamically adjusted to satisfy a specified criterion related to a quality of the image capture.

20 Claims, 17 Drawing Sheets

(56) References Cited

U.S. PATENT DOCUMENTS

| | | |
|---|---|---|
| 7,773,116 B1 | 8/2010 | Stevens |
| 8,031,175 B2 | 10/2011 | Rigazio et al. |
| 8,043,513 B2 | 10/2011 | Milanovic et al. |
| 8,301,326 B2 | 10/2012 | Malecki et al. |
| 8,712,679 B1 | 4/2014 | Mostofi et al. |
| 9,243,916 B2 | 1/2016 | Roumeliotis et al. |
| 9,454,154 B1 | 9/2016 | Safarik |
| 9,534,917 B2 | 1/2017 | Abuelsaad et al. |
| 9,588,516 B1 | 3/2017 | Gurel et al. |
| 9,609,288 B1 | 3/2017 | Richman et al. |
| 9,678,506 B2 | 6/2017 | Bachrach et al. |
| 9,738,381 B1* | 8/2017 | Loud ............... G05D 1/0094 |
| 9,739,870 B1 | 8/2017 | Beckman et al. |
| 9,753,460 B1 | 9/2017 | Safarik |
| 9,766,074 B2* | 9/2017 | Roumeliotis ......... G01C 21/16 |
| 9,798,322 B2 | 10/2017 | Bachrach et al. |
| 9,891,621 B2 | 2/2018 | Bachrach et al. |
| 9,930,298 B2 | 3/2018 | Bevirt |
| 9,972,212 B1 | 5/2018 | Sperindeo et al. |
| 10,007,265 B1 | 6/2018 | Larsen |
| 10,033,980 B2 | 7/2018 | Boyd et al. |
| 10,182,225 B1 | 1/2019 | Cui et al. |
| 10,488,860 B1* | 11/2019 | Koch ................. G01C 21/32 |
| 2007/0078573 A1 | 4/2007 | Ivansson et al. |
| 2007/0106473 A1 | 5/2007 | Bodin et al. |
| 2008/0033604 A1 | 2/2008 | Margolin |
| 2008/0267451 A1 | 10/2008 | Karazi |
| 2009/0125223 A1 | 5/2009 | Higgins |
| 2009/0157233 A1 | 6/2009 | Kokkeby et al. |
| 2009/0228205 A1 | 9/2009 | Ariyur et al. |
| 2010/0013860 A1 | 1/2010 | Mandella et al. |
| 2010/0084513 A1 | 4/2010 | Gariepy et al. |
| 2010/0157055 A1 | 6/2010 | Pechatnikov |
| 2010/0191391 A1 | 7/2010 | Zeng |
| 2010/0198514 A1 | 8/2010 | Miralles |
| 2010/0228414 A1 | 9/2010 | Scheu |
| 2010/0250032 A1 | 9/2010 | Gremmert et al. |
| 2010/0277587 A1 | 11/2010 | Pechatnikov et al. |
| 2010/0305778 A1 | 12/2010 | Dorneich et al. |
| 2011/0044498 A1 | 2/2011 | Cobb et al. |
| 2011/0090399 A1 | 4/2011 | Whitaker et al. |
| 2011/0147515 A1 | 6/2011 | Miller et al. |
| 2011/0311099 A1* | 12/2011 | Derbanne ............... G06T 7/207 382/103 |
| 2012/0114229 A1 | 5/2012 | Zhou |
| 2012/0148162 A1 | 6/2012 | Zhang et al. |
| 2012/0212406 A1 | 8/2012 | Osterhout et al. |
| 2012/0236030 A1 | 9/2012 | Border et al. |
| 2013/0030875 A1 | 1/2013 | Lee et al. |
| 2013/0127980 A1 | 5/2013 | Haddick et al. |
| 2013/0271579 A1 | 10/2013 | Wang et al. |
| 2013/0278631 A1 | 10/2013 | Border et al. |
| 2013/0317667 A1 | 11/2013 | Kruglick |
| 2014/0019352 A1 | 1/2014 | Shrivastava |
| 2014/0035736 A1 | 2/2014 | Weddle et al. |
| 2014/0043436 A1 | 2/2014 | Bell et al. |
| 2014/0067160 A1 | 3/2014 | Levien et al. |
| 2014/0168461 A1 | 6/2014 | Dani et al. |
| 2014/0226024 A1 | 8/2014 | Limbaugh et al. |
| 2014/0267777 A1 | 9/2014 | Le Clerc et al. |
| 2014/0270743 A1 | 9/2014 | Webb et al. |
| 2014/0306866 A1 | 10/2014 | Miller et al. |
| 2014/0316698 A1 | 10/2014 | Roumeliotis et al. |
| 2014/0324253 A1 | 10/2014 | Duggan et al. |
| 2014/0336928 A1* | 11/2014 | Scott ................. G01C 21/206 701/468 |
| 2014/0371952 A1 | 12/2014 | Ohtomo et al. |
| 2015/0022640 A1 | 1/2015 | Metzler et al. |
| 2015/0027044 A1 | 1/2015 | Redden |
| 2015/0062339 A1 | 3/2015 | Ostrom |
| 2015/0153436 A1 | 6/2015 | Benson |
| 2015/0158587 A1 | 6/2015 | Patrick et al. |
| 2015/0160658 A1 | 6/2015 | Reedman et al. |
| 2015/0201180 A1* | 7/2015 | Mourikis ............. H04N 13/296 348/46 |
| 2015/0230150 A1 | 8/2015 | Wang et al. |
| 2015/0242972 A1 | 8/2015 | Lemmey et al. |
| 2015/0259078 A1 | 9/2015 | Filipovic et al. |
| 2015/0310603 A1 | 10/2015 | Moraites et al. |
| 2015/0312774 A1 | 10/2015 | Lau |
| 2015/0346915 A1 | 12/2015 | Kondekar et al. |
| 2015/0370250 A1 | 12/2015 | Bachrach et al. |
| 2016/0018822 A1 | 1/2016 | Nevdahs et al. |
| 2016/0041266 A1 | 2/2016 | Smits |
| 2016/0050840 A1 | 2/2016 | Sauder et al. |
| 2016/0054737 A1 | 2/2016 | Soll et al. |
| 2016/0068267 A1 | 3/2016 | Liu et al. |
| 2016/0070265 A1* | 3/2016 | Liu ..................... G01C 21/00 701/3 |
| 2016/0122038 A1 | 5/2016 | Fleischman et al. |
| 2016/0129999 A1* | 5/2016 | Mays .................. G05D 1/0038 701/2 |
| 2016/0139596 A1 | 5/2016 | Na et al. |
| 2016/0140729 A1* | 5/2016 | Soatto ............... G06K 9/00664 348/135 |
| 2016/0144943 A1 | 5/2016 | Cheng et al. |
| 2016/0232423 A1 | 8/2016 | Zhong et al. |
| 2016/0267325 A1* | 9/2016 | Sundaresan ........ G06K 9/00624 |
| 2016/0280397 A1 | 9/2016 | Christ et al. |
| 2016/0299504 A1 | 10/2016 | Hsiao |
| 2016/0304198 A1* | 10/2016 | Jourdan ............... G05D 1/0088 |
| 2016/0327950 A1 | 11/2016 | Bachrach et al. |
| 2016/0344981 A1 | 11/2016 | Lunt |
| 2017/0010623 A1* | 1/2017 | Tang .................... G01C 3/00 |
| 2017/0023937 A1* | 1/2017 | Loianno ............. G08G 5/0034 |
| 2017/0024877 A1 | 1/2017 | Versace et al. |
| 2017/0031032 A1* | 2/2017 | Garin ................. G01S 19/55 |
| 2017/0039764 A1* | 2/2017 | Hu ....................... G06T 17/05 |
| 2017/0039859 A1* | 2/2017 | Hu ..................... G08G 5/0034 |
| 2017/0066135 A1 | 3/2017 | Cohen et al. |
| 2017/0116776 A1 | 4/2017 | Aughey |
| 2017/0180729 A1 | 6/2017 | Wu |
| 2017/0180754 A1 | 6/2017 | Wu et al. |
| 2017/0192418 A1 | 7/2017 | Bethke et al. |
| 2017/0201714 A1 | 7/2017 | Kim et al. |
| 2017/0210486 A1 | 7/2017 | O'brien et al. |
| 2017/0219347 A1 | 8/2017 | Veto |
| 2017/0227656 A1* | 8/2017 | Niesen ................ G01C 21/165 |
| 2017/0278014 A1* | 9/2017 | Lessmann ............ G06K 9/6267 |
| 2017/0294010 A1 | 10/2017 | Shen et al. |
| 2017/0301109 A1* | 10/2017 | Chan ..................... B64C 39/024 |
| 2017/0305546 A1 | 10/2017 | Ni et al. |
| 2017/0313416 A1 | 11/2017 | Mishra et al. |
| 2017/0313441 A1 | 11/2017 | Tsai |
| 2017/0314926 A1 | 11/2017 | Royster et al. |
| 2017/0314927 A1 | 11/2017 | Royster et al. |
| 2017/0329324 A1 | 11/2017 | Bachrach et al. |
| 2017/0341776 A1* | 11/2017 | McClure ................ G05D 1/102 |
| 2017/0351933 A1 | 12/2017 | Bleiweiss |
| 2017/0357858 A1* | 12/2017 | Mendonca ............. G06T 7/30 |
| 2017/0359515 A1* | 12/2017 | Harris ................. H04N 5/23287 |
| 2017/0359943 A1* | 12/2017 | Calleija ............... A01M 21/043 |
| 2017/0371353 A1* | 12/2017 | Millinger, III ........ G01S 5/0263 |
| 2018/0046187 A1 | 2/2018 | Martirosyan et al. |
| 2018/0074524 A1 | 3/2018 | Yamasaki |
| 2018/0095459 A1 | 4/2018 | Bachrach et al. |
| 2018/0157255 A1* | 6/2018 | Halverson ............. B64C 39/024 |
| 2018/0201272 A1 | 7/2018 | Takeda |
| 2018/0246507 A1 | 8/2018 | Bachrach et al. |
| 2019/0011921 A1 | 1/2019 | Wang et al. |
| 2019/0027036 A1 | 1/2019 | Mishina et al. |
| 2019/0035278 A1 | 1/2019 | Mishina et al. |
| 2019/0149735 A1* | 5/2019 | Harris ................ H04N 5/23287 348/144 |

OTHER PUBLICATIONS

N.J. Brake (2012). Control system development for small UAV gimbal. Retrieved at https://digitalcommons.calpoly.edu/theses/838 (Year: 2012).*

Horenstein, Henry, "Black & White Photography: A Basic Manual", Third Revised Edition, Little, Brown and Company, Chapter 6, 2005, p. 94.

(56) References Cited

OTHER PUBLICATIONS

Kakvand, P. et al., "Smart on-board UAV system: Using computer visional system to find a movable and stationery target", 2015 2nd Int'l. Conf. on Knowledge-Based Engineering and Innovation (KBEI), IEEE, Nov. 5-6, 2015, pp. 694-699.

Kalnins, L. M., "Coordinate Systems", Retrieved from the internet on Jun. 13, 2016: <URL: https://www.earth.ox.ac.ukl-larak/MMES/CoordinateSystems.pdf.

Mansfield, Katrina et al., "Unmanned Aerial Vehicle Smart Device Ground Control Station Cyber Security Threat Model", 2013 IEEE International Conference on Technologies for Homeland Security (HST), IEEE, Nov. 12, 2013, pp. 722-728.

O'Reilly, O.M., "Engineering Dynamics: A Primer", Chapter 2, Particles and Cylindrical Polar Coordinates, Springer Science & Business Media LLC, 2010, pp. 17-25.

Santana, Lucas Vago et al., "Outdoor waypoint navigation with the AR. Drone quadrotor", 2015 International Conference on Unmanned Aircraft Systems (ICUAS), IEEE, Jun. 9-12, 2015, pp. 303-311.

\* cited by examiner

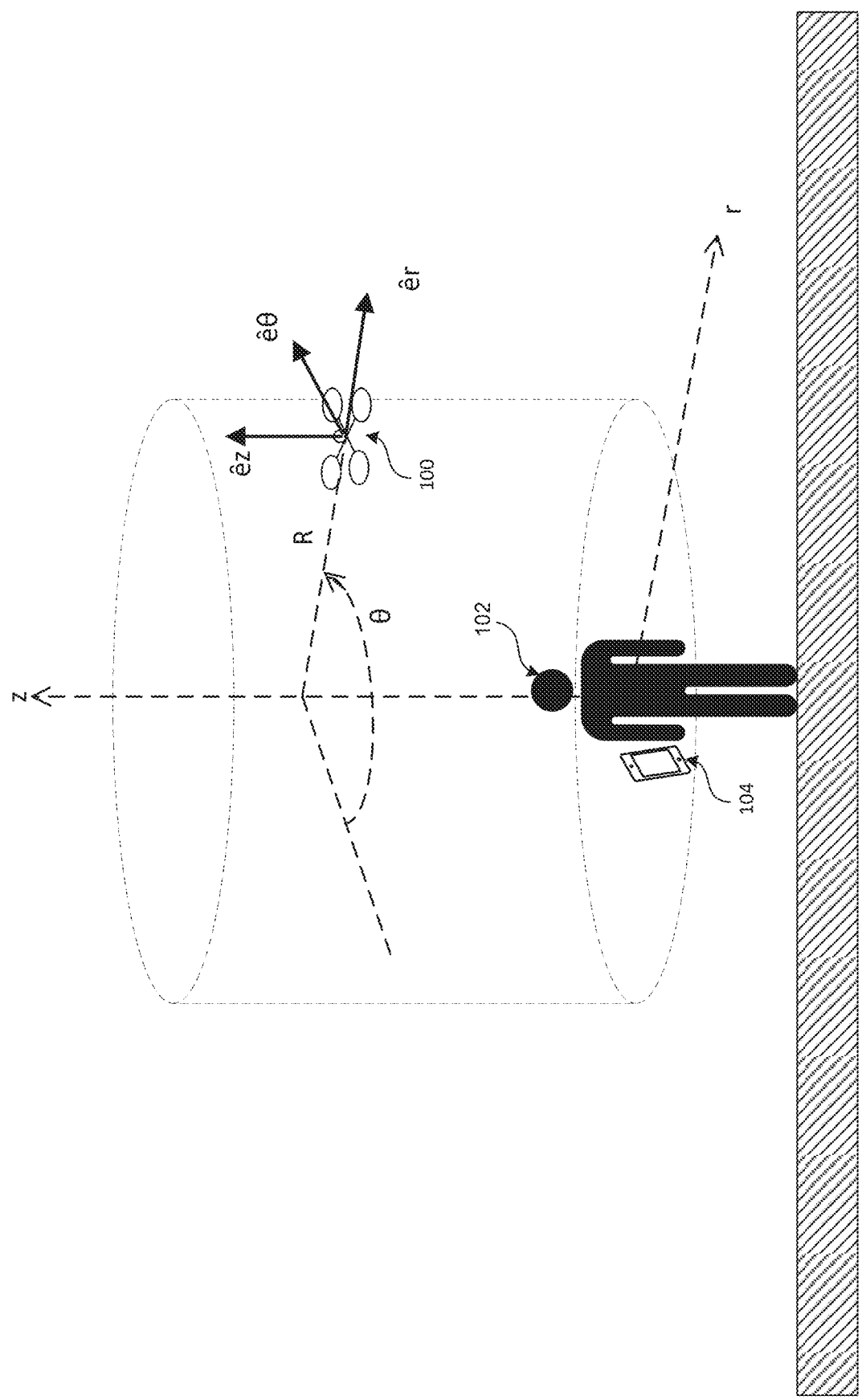

UNMANNED AERIAL IMAGE CAPTURE PLATFORM

CROSS-REFERENCE TO RELATED APPLICATION(S)

This application is a continuation application of U.S. patent application Ser. No. 15/235,513, entitled "UNMANNED AERIAL IMAGE CAPTURE PLATFORM," filed Aug. 12, 2016, which is hereby incorporated by reference in its entirety for all purposes. This application is therefore entitled to a priority date of Aug. 12, 2016.

TECHNICAL FIELD

The present disclosure relates generally to methods and systems for the control of unmanned aerial vehicles (UAV) used as platforms for the capture of images (including video).

BACKGROUND

Unmanned aerial vehicles (UAV) are increasingly being used as platforms for taking images and video from the air. A number of UAV systems are currently available that provide for image and video capture and remote control from a device on the ground. However, currently available systems require piloting using direct control of the UAV similar to other fixed wing or rotor-craft. In other words, available systems require control by directly adjusting the pitch, roll, yaw, and power of the UAV, for example using common control inputs such as a joystick and throttle control. While effective to a degree, such control systems require expertise on the part of the remote pilot and are prone to crashes caused by pilot error.

BRIEF DESCRIPTION OF THE DRAWINGS

FIG. 7A illustrates an example technique for defining the motion of a UAV relative to a point of reference using a cylindrical polar coordinate system;

DETAILED DESCRIPTION

Overview

Figure 1:
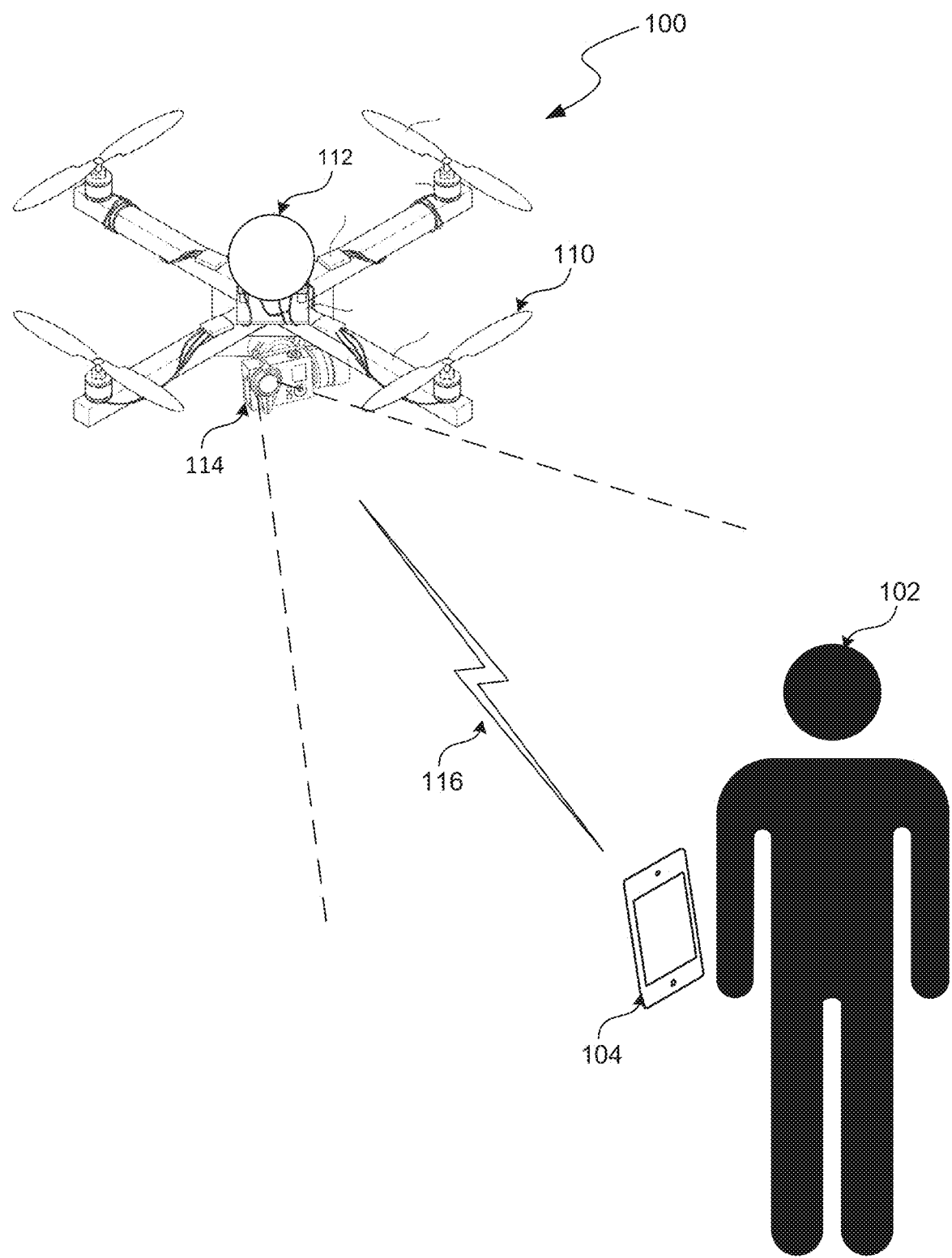
FIG. 1 is illustration of an example unmanned aerial vehicle ("UAV")

FIG. 1 is an illustration of an unmanned aerial vehicle ("UAV") 100 operating as an automated aerial platform for capturing images. As shown in FIG. 1, in some embodiments, UAV 100 may be a rotor-based aircraft (e.g., a "quadcopter"). The UAV 100 as shown in FIG. 1 may include propulsion and control actuators 110 (e.g. powered rotors or aerodynamics control surfaces) for maintaining controlled flight, sensors for automated navigation and flight control 112 (e.g. an array of multiple image capture devices-described in more detail herein), a gimbaled image capture device 114 for capturing images (including video), other sensors (not shown) (e.g. for capturing audio), and means (not shown) for communicating with other devices (e.g. a mobile device 104), for example via a wireless connection 116. The UAV 100 shown in FIG. 1 is according to an example embodiment. A UAV 100 in accordance with the present teachings may include more or fewer components than as shown. An example UAV system that may be part of UAV 100 is described later with respect to FIG. 13.

In FIG. 1, UAV 100 is shown capturing images of a human subject 102 that in some embodiments may be a user (i.e. in communication with UAV 100 via a mobile device 104). However, a communication link with another device (e.g. mobile device 104) and control by a human user is not necessary. UAV 100 may autonomously (i.e. without direct human control) navigate the physical environment, for example by applying a process of visual inertial odometry using images captured by an array of multiple image capture devices. While in autonomous flight, UAV 100 can capture images of one or more subjects in the physical environment using the same array of image capture devices and/or the separate gimbaled image capture device 114. In this sense, UAV 100 may generally be conceptualized as an autonomous aerial camera rather than as a vehicle with an attached camera, and may therefore represent a paradigm shift in which cameras are understood.

To improve the quality of image capture (objectively and/or subjectively), one or more criteria may be specified that define how UAV 100 is to respond to given conditions while autonomously capturing images over a physical environment. In other words, to satisfy the specified one or more criteria, UAV 100 may be configured to automatically adjust image capture, which may in some cases include adjusting its flight path. As an illustrative example, consider an example criterion that states that while tracking and capturing images of a subject in motion, the UAV 100 is to always (or at least within a threshold tolerance) maintain a clear line of sight with the subject. In other words, it is not enough to stay within a maximum separation distance. If the line of sight with the subject becomes obstructed by another object in the physical environment, the UAV may automatically adjust its flight path to alleviate the obstruction. The particular maneuver required in any given situation depends on the geometric configuration of the subject and the UAV within the physical environment. As an illustrative example, consider a UAV 100 tracking a human subject in motion. As the human subject moves under a tree, the view from the UAV 100 located overhead becomes obstructed by the leaves of the tree. To satisfy the specified criterion (of maintaining clear line of sight) a processing unit (located on board the UAV or remotely and in communication with the UAV) may generate commands configured to adjust image capture, for example, by causing the UAV 100 to reduce altitude below the level of the leaves to alleviate the obstruction in the view.

Flying Digital Assistant—Localization and Navigation

Figure 2:
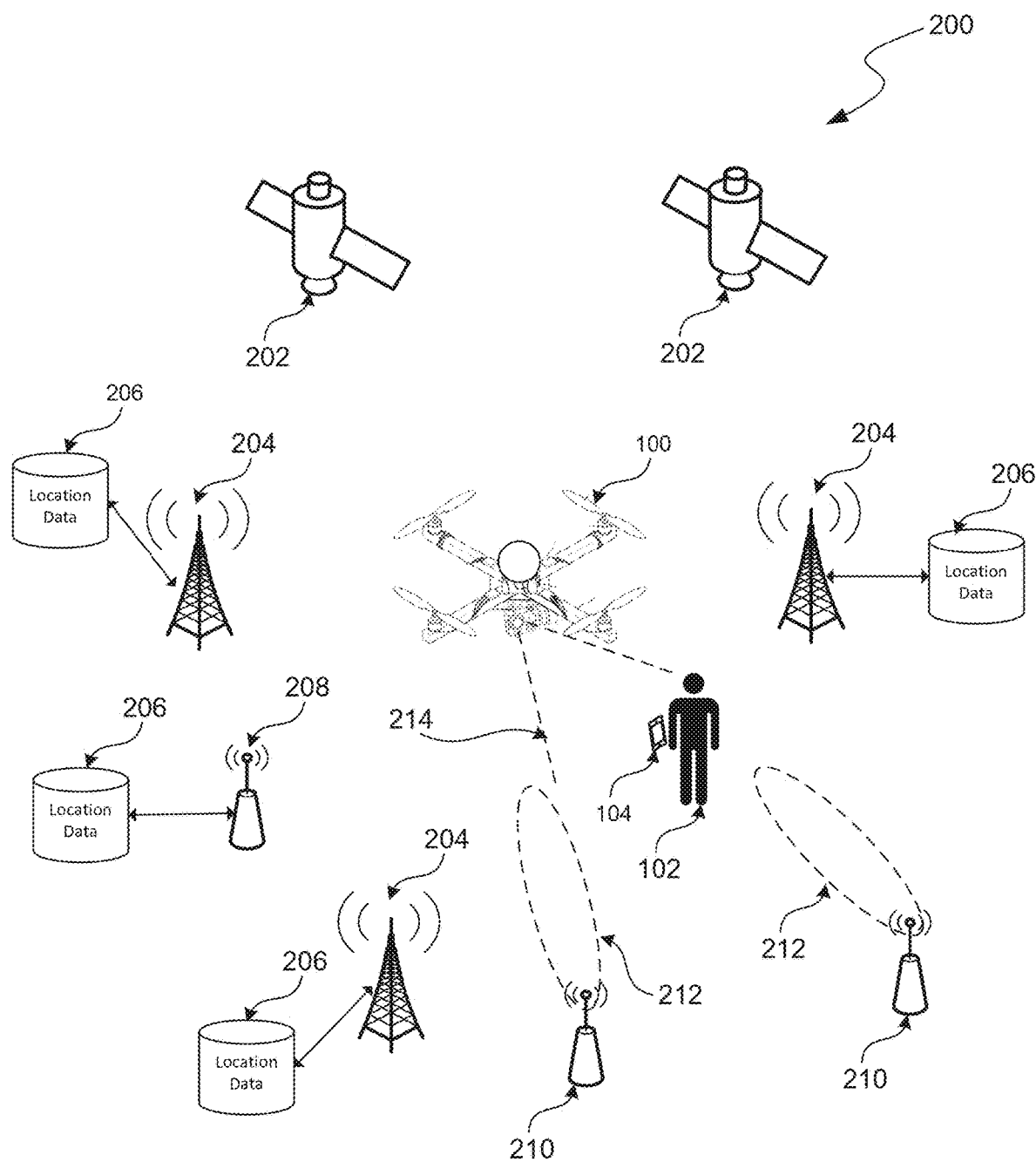
FIG. 2 is a conceptual diagram of an example localization and navigation system for guiding navigation and image capture by a UAV.

FIG. 2 is a high-level illustration of a localization and navigation system 200, according to some embodiments, for guiding navigation and image capture by an UAV 100. According to some embodiments, a relative position and/or orientation of the UAV 100, and or a relative position and/or orientation of a subject 102 may be determined using one or more of the subsystems illustrated in FIG. 2. It shall be understood that by tracking relative positions and/or orientations over time (continuously or at regular or irregular time intervals (i.e. continually)), the motions (e.g. velocity, acceleration, etc.) of UAV 100 and one or more subjects through a physical environment may be estimated. Accordingly, any systems described herein for determining position and/or orientation may similarly be employed for estimating motion. According to the present teaching localization a system 200 may include a UAV 100, a global positioning system (GPS) comprising multiple GPS satellites 202, a cellular system comprising multiple cellular antennae 204 (with access to sources of localization data 206), a Wi-Fi system comprising multiple Wi-Fi routers 208 (with access to sources of localization data 206), and a portable multi-function device 104 operated by a user (in this example human subject 102).

The UAV 100 may comprise components including, but not limited to, an inertial measurement unit (IMU), a GPS receiver, multiple RF receivers and/or transceivers (e.g. cellular LTE, Wi-Fi), and one or more image capture devices. For example, an image capture device may be used to determine position and/or pose through the use of computer vision techniques and or optics-based collision detection and range finding. This is illustrated conceptually in FIG. 2 by the dotted line 214. These components are described in more detail in the section titled "Unmanned Aerial Vehicle—Example System" and with reference to FIG. 13.

Figure 13:
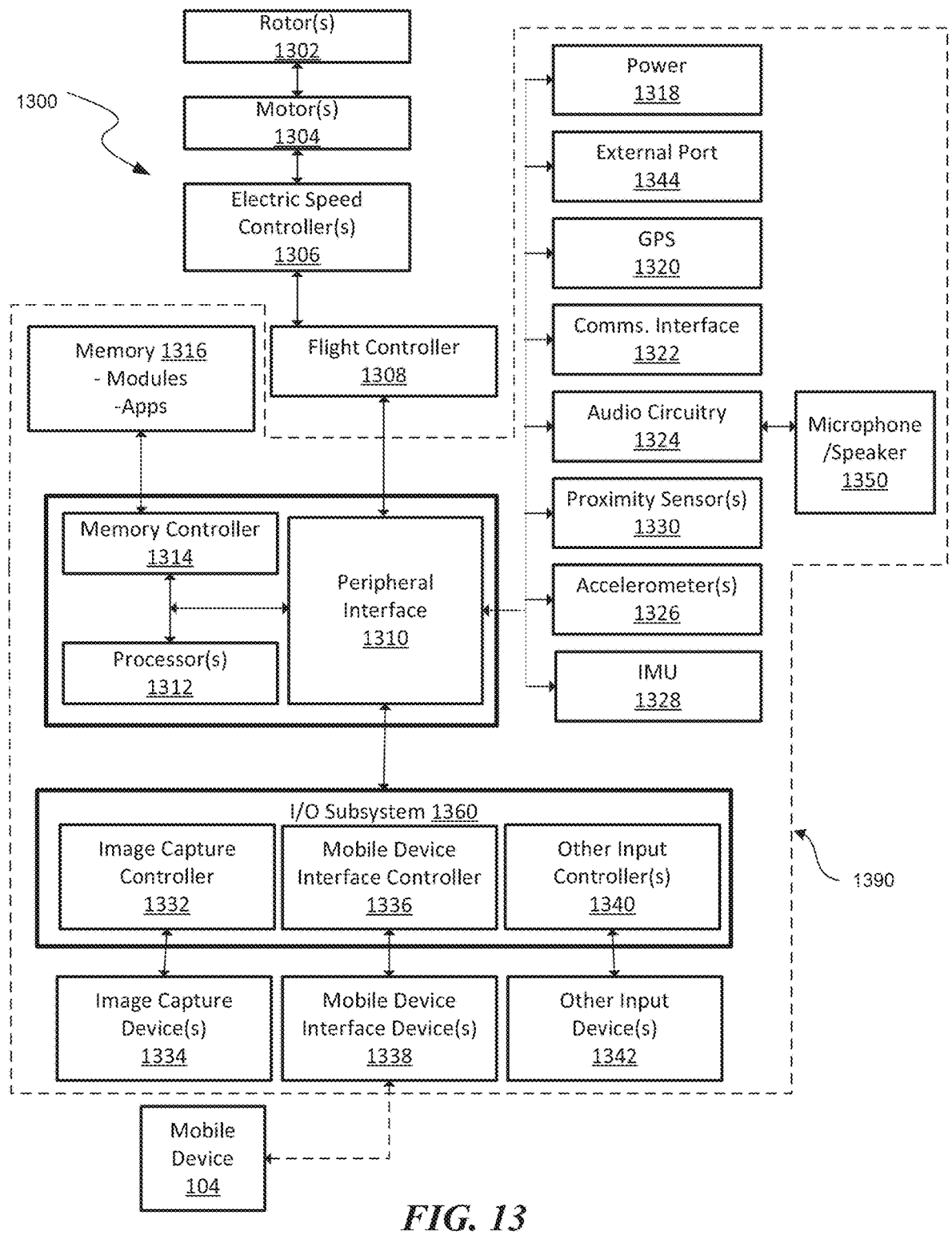
FIG. 13 is a diagram of an example UAV system.
Figure 14:
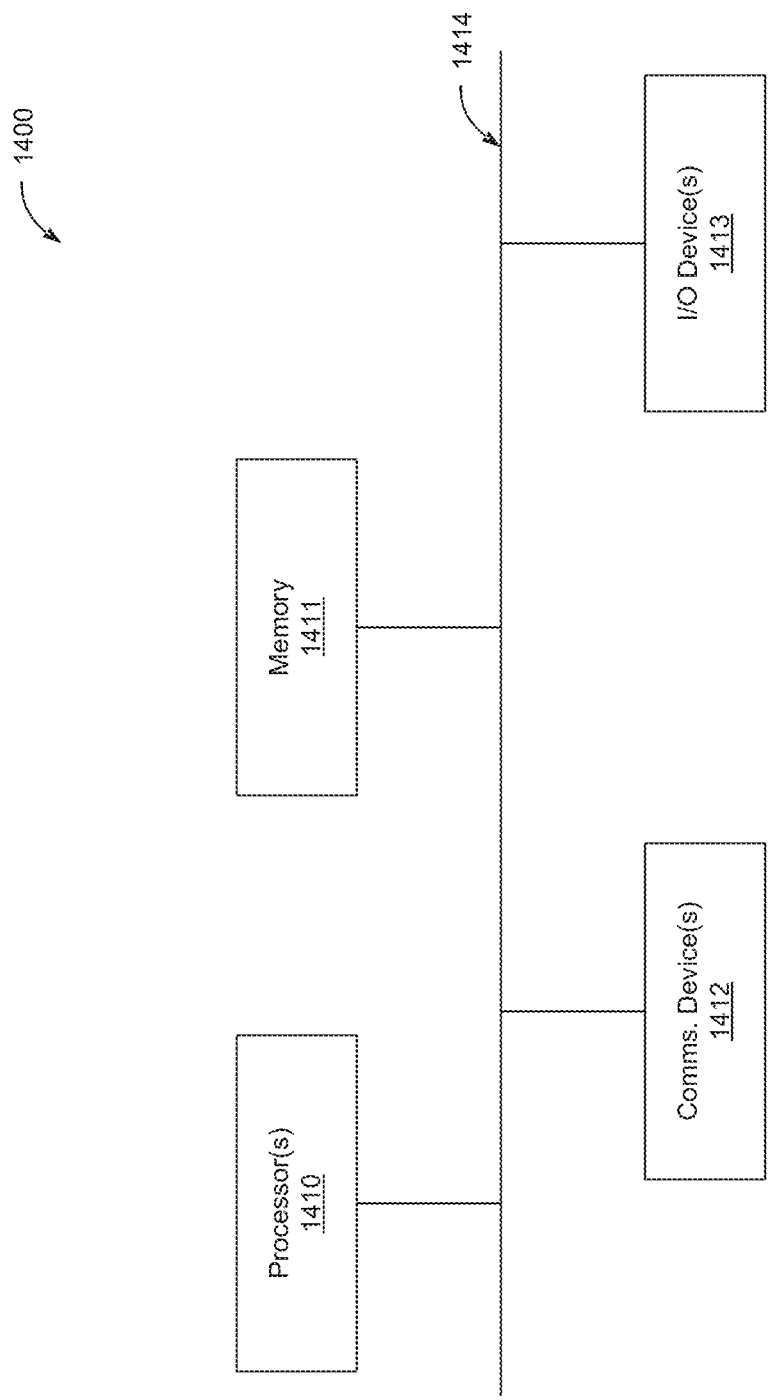
FIG. 14 is a diagram of a computing system.

Mobile device 104 may be any type of portable computing device. For example, mobile device 104 may include a notebook, a laptop computer, a handheld computer, a palmtop computer, a cell phone, a PDA, a smart phone (e.g., iPhone™, etc.), a tablet (e.g., iPad™, etc), a hand held gaming device (e.g., Sony PSP™, etc.), a smart watch (e.g., Apple Watch™, etc.), an augmented reality device (e.g., Google Glass™, etc.), a virtual reality device (e.g. Oculus Rift™, etc.) or any other portable computing device. Further, mobile device 104 may include any of the components described with respect systems 1300 or 1400 as shown in FIGS. 13 and 14 (respectively), including, but not limited to, an inertial measurement unit (IMU), a GPS receiver, multiple RF receivers and/or transceivers (e.g. cellular LTE, Wi-Fi), and an image capture device. As used in this disclosure, the term "system" may refer to a computing system operating as part of and/or in conjunction with any of the computing systems described with respect to FIGS. 13 and 14. In some embodiments, methods described herein may be performed by a computing system that is not part of UAV 100 or a mobile device 104, for example a general computing system illustrated with respect to FIG. 14.

As mentioned earlier, a relative position and/or orientation of the UAV 100, a relative position and/or orientation of the subject 102, and/or a relative position and/or pose of a mobile device 104 operated by a user may be determined using one or more of the subsystems illustrated in FIG. 2. For example, using only the GPS system 202, a position on the globe may be determined for any device comprising a GPS receiver (e.g. the UAV 100 and/or the mobile device 104). While GPS by itself in certain implementations may provide highly accurate global positioning it is generally is not capable of providing accurate information regarding orientation. Instead a technique of multiple inputs and multiple outputs ("MIMO") (as illustrated in FIG. 2) may be used for localization, potentially in conjunction with other localization subsystems.

Consider the example based on the illustration in FIG. 2; a user (human subject 102) is utilizing an autonomous UAV 100 via a mobile device 104 to film herself overhead. In order navigate the UAV 100 and inform the tracking by an image capture device of the subject 102 (in this case the user), a relative position and orientation of the UAV 100 relative to the mobile device 104 (or any other point of reference) may be necessary.

According to the present teachings a relative position between the UAV 100 and the mobile device 104 may be determined using a GPS system to determine a global position of the UAV 100, a global position of the mobile device 104 and compare the two.

Similarly, using an array of cellular and or/Wi-fi antennae, a position relative to the known locations of antennae may be determined for both the UAV 100 and mobile device 104 using known positioning techniques. Some known positioning techniques include those based on signal trilateration, for example round trip time of arrival (RTT) in which a signal is sent and received by a signal transceiver and distance is calculated based on the elapsed time, received signal strength (RSS) in which the power levels of the transmitted signal and the received signals are analyzed and a distance determined based on a known propagation loss. Other known positioning techniques include those based on signal triangulation, for example angle of arrival (AoA) in which angles of arriving signals are determined and through applied geometry a position determined. Current Wi-Fi standards, such as 802.11ac, allow for RF signal beamforming (i.e. directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 2 by dotted lines 212 emanating from WiFi routers 210.

Figure 3:
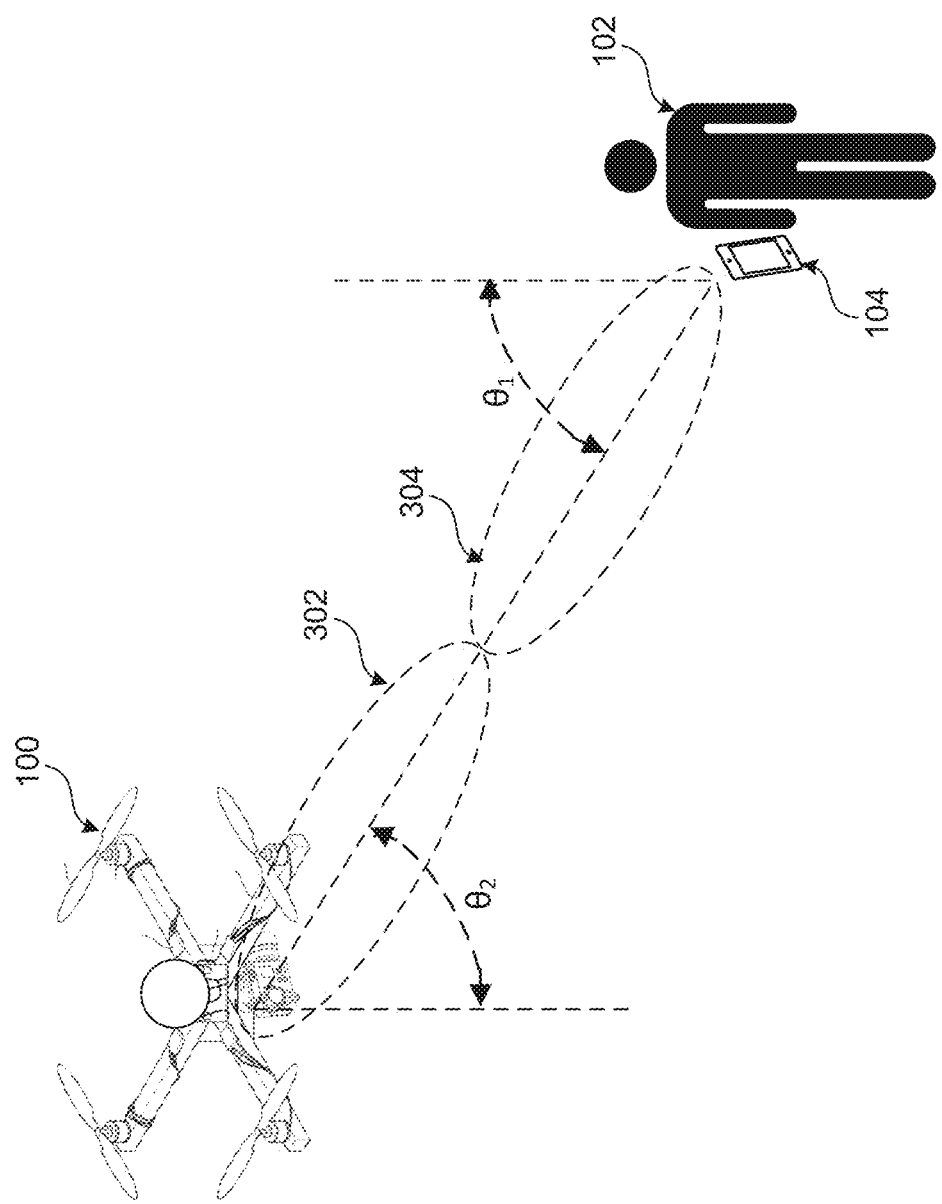
FIG. 3 is a conceptual diagram of an example system for estimating the position and/or orientation of a UAV using a network of phased array wireless transceivers.

As illustrated in FIG. 3, a UAV 100 and/or mobile device 104 may include a phased array of WiFi antenna and a relative position and/or pose may be calculated without the necessity for external existing Wi-Fi routers. According to some embodiments, the UAV 100 and/or mobile device 104 may transmit and/or receive a beamformed RF signal via a phased antenna array. The UAV 100 and/or mobile device 104 may then detect the phase differences and power levels of the respective incoming signals and calculate an AoA for the incoming signals. For example according to FIG. 3, the mobile device 104 may determine an AoA of θ1 for the RF signals 302 transmitted by the UAV 100. Similarly, the UAV 100 may determine an AoA of θ2 for the RF signals 304 transmitted by the mobile device 104. This AoA information may then be incorporated with information gathered by an IMU on the UAV 100 and/or mobile device 104 (as well as other positioning data as described earlier) in order to infer a relative position and/or orientation between the UAV 100 and the mobile device 104.

Figure 4:
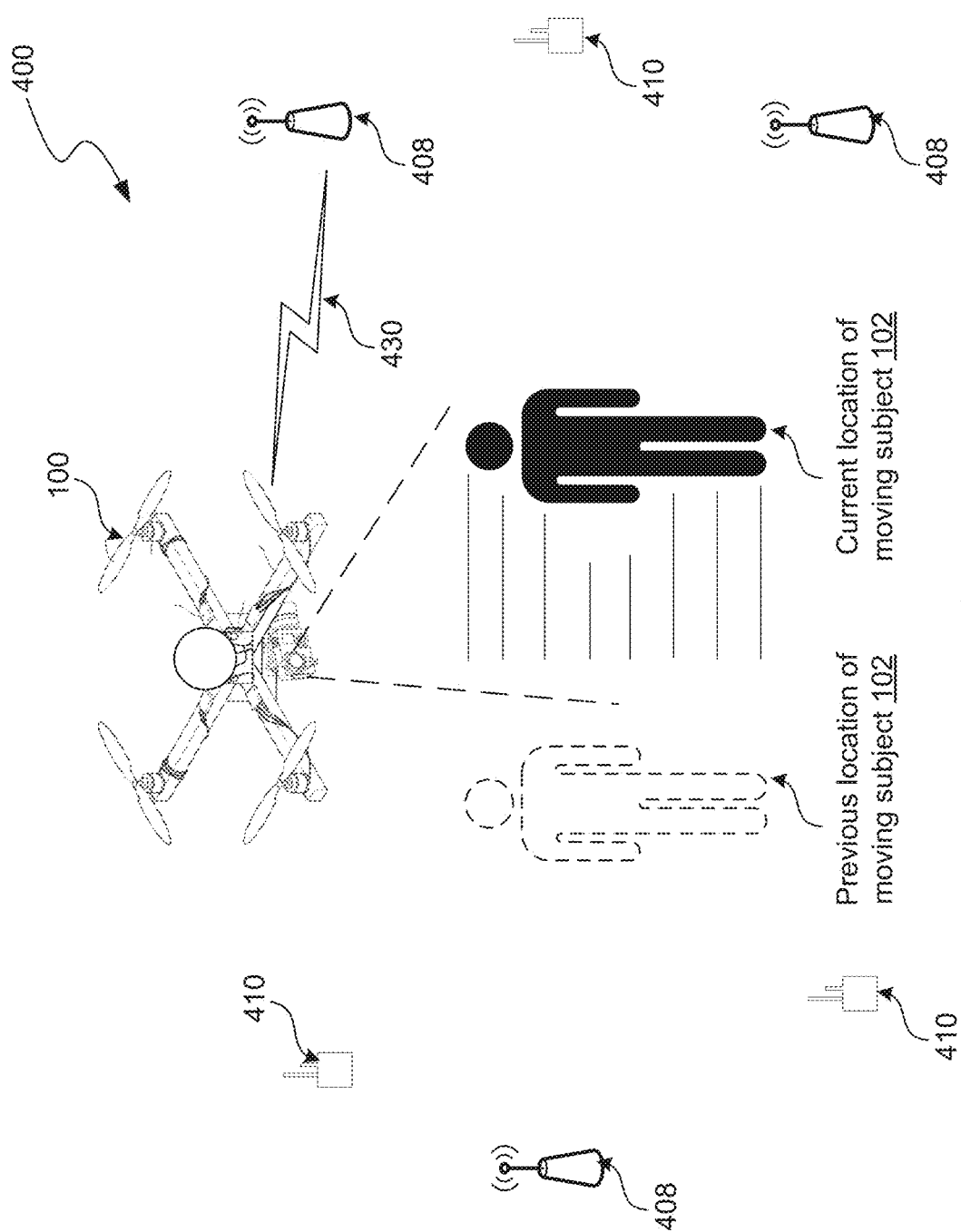
FIG. 4 is a conceptual diagram of an example system for passive localization of a subject tracked by a UAV.

According to some embodiments, an array of Wi-Fi transmitters and signal monitors may be utilized for device-free passive localization of objects that are not transmitting signals (e.g. a human subject not carrying a mobile device). FIG. 4 illustrates an example system 400 for device-free passive localization of subject (e.g. a human subject 102). In this example a human subject 102 passes through a network of Wi-Fi transmitters 408 transmitting RF signals. The signal monitors 410 (e.g. standard wireless sniffers) may detect changes in the characteristics of the RF signals received from the Wi-Fi transmitters 408 caused by interference as the human subject 402 passes through the signal field. Using localization algorithms, such changes in the RF signal field may be correlated to the presence of the subject 102, its type, its orientation and its location. Also, according to FIG. 4., information gathered by device-free passive localization system 400 may be fed wirelessly (e.g. via Wi-Fi connection 430) for to a nearby UAV 100 in order to inform its tracking of the human subject 102.

According to some embodiments an inertial measurement unit (IMU) may be used to determine relative position and/or orientation. An IMU is a device that measures a vehicle's angular velocity and linear acceleration. These measurements can be fused with other sources of information (e.g. those discussed above) to accurately infer velocity, orientation, and sensor calibrations. As described herein, a UAV 100 and/or mobile device 104 may include one or more IMUs. Using a method commonly referred to as "dead reckoning" an IMU (or associated systems) may calculate and track a predicted a current position based on a previously known position(s) using measured accelerations and the time elapsed from the previously known position(s). While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g. the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

According to some embodiments, computer vision may be used to determine a relative position and/or orientation of a UAV 100, mobile device 104, and or any other object. The term, "computer vision" in this context may generally refer to the acquiring, processing, analyzing and "understanding" of captured images. Consider again the localization system illustrated in FIG. 2. According to some embodiments, a UAV 100 may include an image capture device and computer vision capabilities. In this example, UAV 100 may be programmed to track a user 102 (or other physical object). Using computer vision, a UAV 100 may recognize the captured image as the subject and may use the recognition information to perform aerial maneuvers by the UAV 100 to keep the subject in view, and/or may make adjustments to an image stabilization system (e.g. a gimbaled image capture device) to keep the subject in view.

Relative position and/or orientation may be determined through computer vision using a number of methods. For example, in some embodiments, raw image data received from one or more image capture devices (onboard or remote from the UAV 100) may be received and processed to correct for certain variables (e.g. differences in camera orientation and/or intrinsic parameters (e.g. lens variations)). According to some embodiments, an image capture device of the UAV 100 may include two or more cameras, for example an array of multiple cameras that provide an unobstructed view around the UAV 100. By comparing the captured image from two or more vantage points (e.g. at different time steps from an image capture device in motion), a system employing computer vision may calculate estimates for the relative position and/or orientation of the vehicle on which the image capture device is mounted (e.g. UAV 100) and/or of a captured object in the physical environment (e.g. the subject). With the calculated position and/or orientation data for the UAV 100 (e.g., data from GPS, WiFi, Cellular, and/or IMU, as discussed above) a relative position and/or orientation may be determined between the UAV 100 and the captured physical object.

According to some embodiments, an image capture device of UAV 100 may be a single camera (i.e. a non-stereoscopic camera). Here, computer vision algorithms may identify the presence of an object and identify the object as belonging to a known type with particular dimensions. In such embodiments, an object may be identified by comparing the captured image to stored two-dimensional (2D) and/or three-dimensional (3D) appearance models. For example, through computer vision, the subject 102 may be identified as an adult male human. In some embodiments the 2D and/or 3D appearance models may be represented as a trained neural network that utilizes deep learning to classify objects in images according to detected patterns With this recognition data, as well as other position and/or orientation data for the UAV 100 (e.g. data from GPS, WiFi, Cellular, and/or IMU, as discussed above), UAV 100 may estimate a relative position and/or orientation of the subject 102.

Figure 5A:
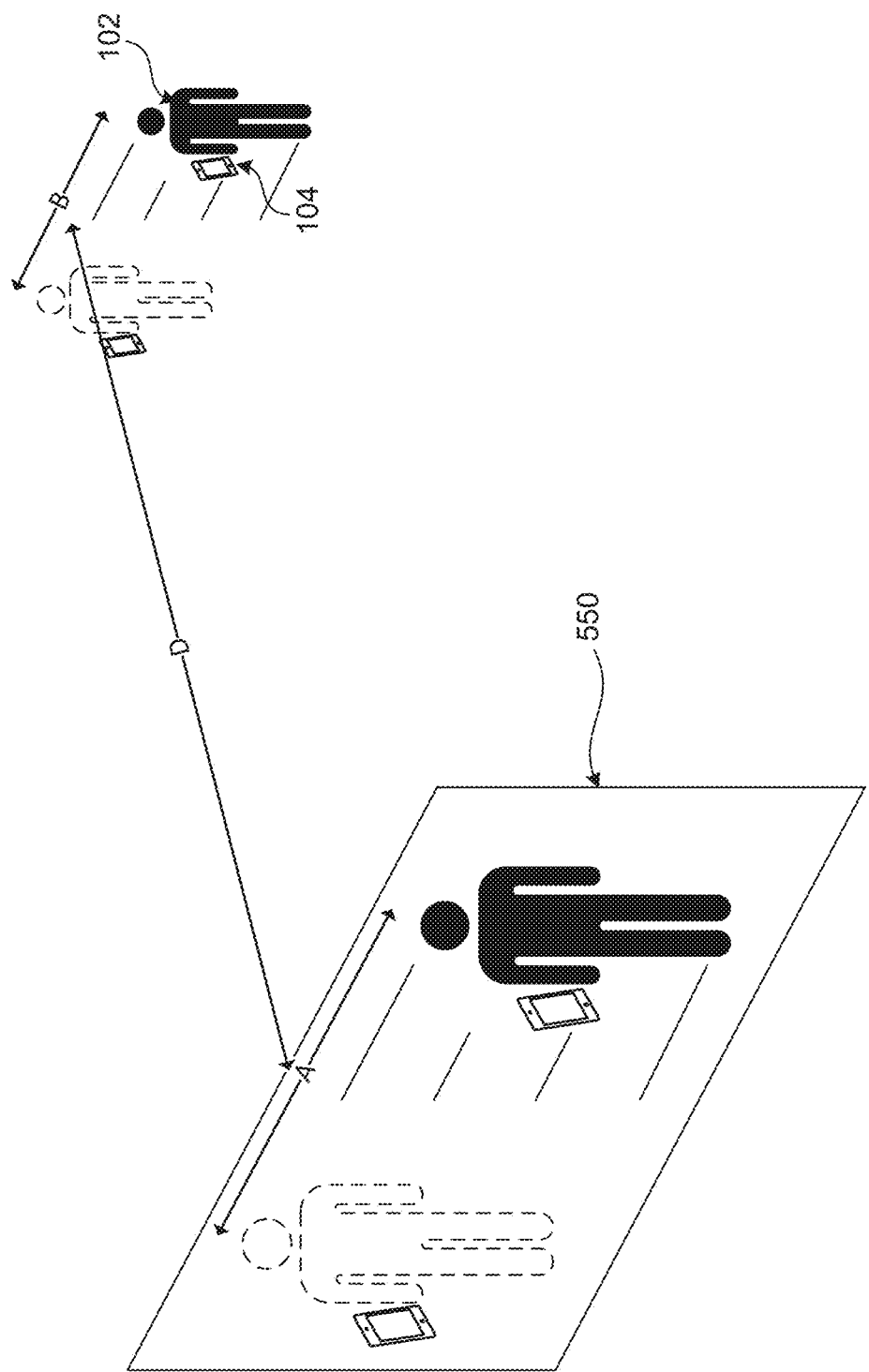
FIGS. 5A-5B illustrate example techniques for estimating the position and/or orientation of objects using images captured by a UAV.
Figure 5B:
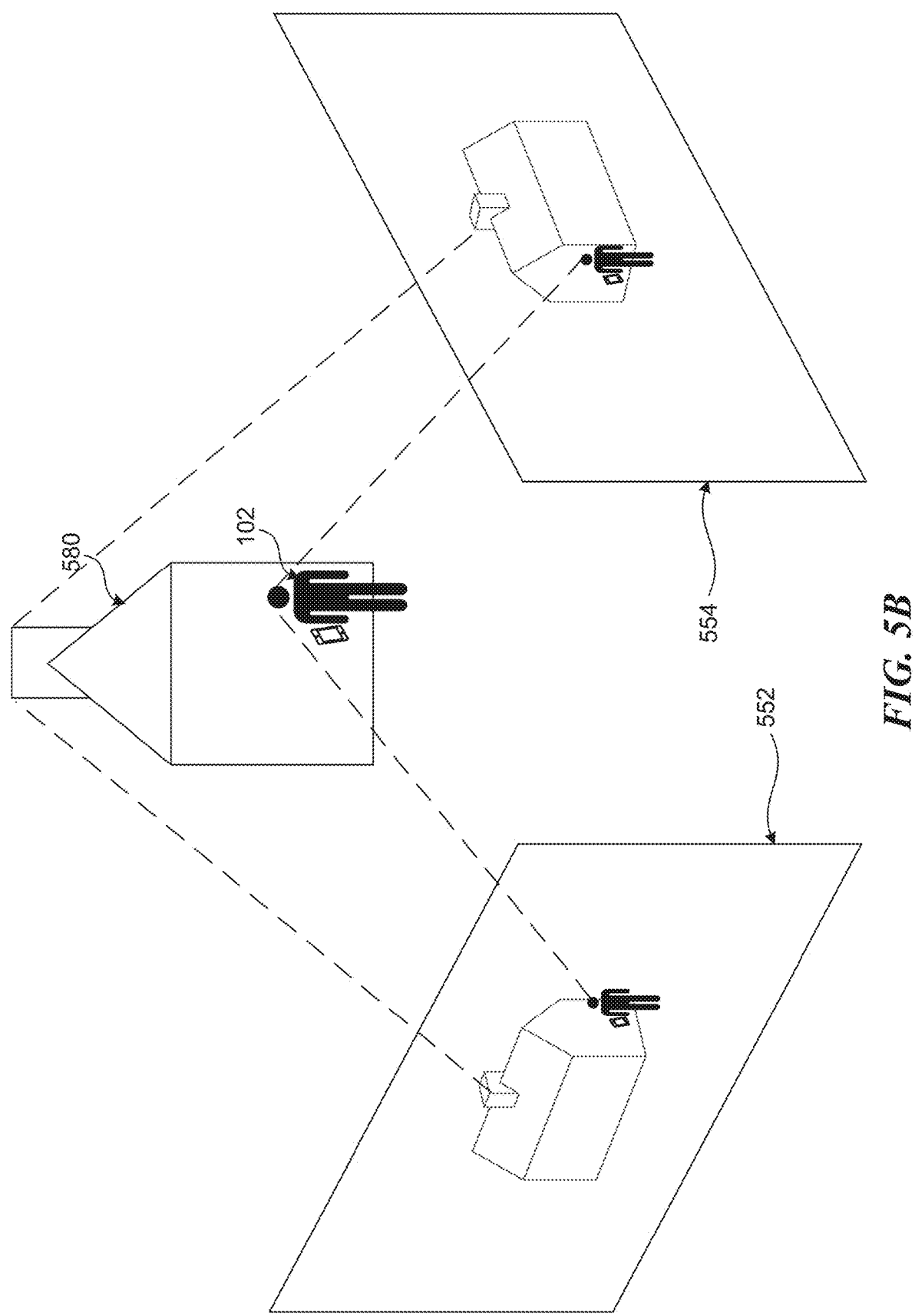

According to some embodiments, computer vision may be used along with measurements from an IMU (or accelerometer(s) or gyroscope(s)) within the UAV 100 and/or mobile device 104 carried by a user (e.g. human subject 102) as illustrated in FIG. 5A-5B. FIG. 5A shows a simplified diagram that illustrates how sensor data gathered by an IMU at a mobile device 104 may be applied to sensor data gathered by an image capture device at UAV 100 to determine position and/or orientation data of a physical object (e.g. a user 102). Outline 550 represents the two-dimensional image captured field of view at UAV 100. As shown in FIG. 5A, the field of view includes the image of a physical object (here user 102) moving from one position to another. From its vantage point, UAV 100 may determine a distance A traveled across the image capture field of view. The mobile device 104, carried by user 102, may determine an actual distance B traveled by the user 102 based on measurements by internal sensors (e.g. the IMU) and an elapsed time. The UAV 100 may then receive the sensor data and/or the distance B calculation from mobile device 104 (e.g., via wireless RF signal). Correlating the difference between the observed distance A and the received distance B, UAV 100 may determine a distance D between UAV 100 and the physical object (user 102). With the calculated distance as well as other position and/or orientation data for the UAV 100 (e.g. data from GPS, WiFi, Cellular, and/or IMU, as discussed above) a relative position and/or orientation may be determined between the UAV 100 and the physical object (e.g. user 102).

Alternatively, estimations for the position and/or orientation of either the UAV 100 or mobile device 104 may be made using a process generally referred to as "visual inertial odometry" or "visual odometry." FIG. 5B illustrates the working concept behind visual odometry at a high level. A plurality of images are captured in sequence as an image capture device moves through space. Due to the movement of the camera, the images captured of the surrounding space change from frame to frame. In FIG. 5B, this is illustrated by initial image capture field of view 552 and a subsequent image capture field of view 554 captured as the camera has moved from a first position and orientation to a second position and orientation over an elapsed time. In both images, the camera may capture real world physical objects, for example, the house 580 and/or the human subject 102. Computer vision techniques are applied to the sequence of images to detect and match features of physical objects captured in the field of view of the camera. For example, a system employing computer vision may search for correspondences in the pixels of digital images that have overlapping fields of view (FOV). The correspondences may be identified using a number of different methods such as correlation-based and feature-based methods. As shown in, in FIG. 5B, features such as the head of a human subject 102 or the corner of the chimney on the house 580 can be identified, matched, and thereby tracked. By incorporating sensor data from an IMU (or accelerometer(s) or gyroscope(s)) associated with the camera to the tracked features of the image capture, estimations may be made for the position and/or orientation of the camera over time. Further, these estimates can be used to calibrate the localization systems, for example through estimating differences in camera orientation and/or intrinsic parameters (e.g. lens variations)) or IMU biases and/or orientation. Visual inertial odometry may be applied at both the UAV 100 and mobile device 104 to calculate the position and/or orientation of both systems. Further, by communicating the estimates between the systems (e.g. via a Wi-Fi connection) estimates may be calculated for the respective positions and/or orientations relative to each other. As previously mentioned, position, orientation, and motion estimation based in part on sensor data from an on board IMU may introduce error propagation issues. As previously stated, optimization techniques may be applied to position, orientation, and motion estimations to counter such uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, systems in accordance with the present teachings may simultaneously generate a 3D map of the surrounding physical environment while estimating the relative positions and/or orientations of the UAV 100 and/or subject within the physical environment. This is sometimes referred to simultaneous localization and mapping ("SLAM"). In such embodiments, using computer vision processing, a system in accordance with the present teaching can search for dense correspondence between images with overlapping FOV (e.g. images taken during sequential time steps and/or stereoscopic images taken at the same timestep). The system can then use the dense correspondences to estimate a depth or distance to each pixel represented in each image. These depth estimates can then be used to continually update a generated 3D model of the physical environment taking into account motion estimates for the image capture device (i.e. UAV 100) through the physical environment.

According to some embodiments, computer vision may include sensing technologies other than image capture devices (i.e. cameras) such as laser illuminated detection and ranging (LIDAR or Lidar). For example, a UAV 100 equipped with LIDAR may emit one or more laser beams in a continuous scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Such 3D models may be analyzed to identify particular physical objects (e.g. subject 102) in the physical environment for tracking. Further, images captured by cameras (e.g., as described earlier) may be combined with the laser constructed 3D models to form textured 3D models that may be further analyzed in real time or near real time for physical object recognition (e.g. by using computer vision algorithms).

The computer vision-aided localization and navigation system described above may calculate the position and/or pose of features in the physical world in addition to the position and/or pose of the UAV 100 and/or mobile device 104. The position of these features may then be fed into the navigation system such that motion trajectories may be planned that avoid obstacles. In addition, in some embodiments, the visual navigation algorithms may incorporate data from proximity sensors (e.g. electromagnetic, acoustic, and/or optics based) to estimate obstacle position with more accuracy. Further refinement may be possible with the use of stereoscopic computer vision with multiple cameras, as described earlier.

According to some embodiments, the previously described relative position and/or orientation calculations may be performed by a UAV 100, mobile device 104, other remote computing device(s) (not shown in the figures), or any combination thereof.

The localization system 200 of FIG. 2 (including all of the associated subsystems as previously described) is only one example of a system for localization and navigation. Localization system 200 may have more or fewer components than shown, may combine two or more components, or a may have a different configuration or arrangement of the components. Some of the various components shown in FIGS. 2 through 4 may be implemented in hardware, software or a combination of both hardware and software, including one or more signal processing and/or application specific integrated circuits.

Flying Digital Assistant—Array of Image Capture Devices

Figure 6:
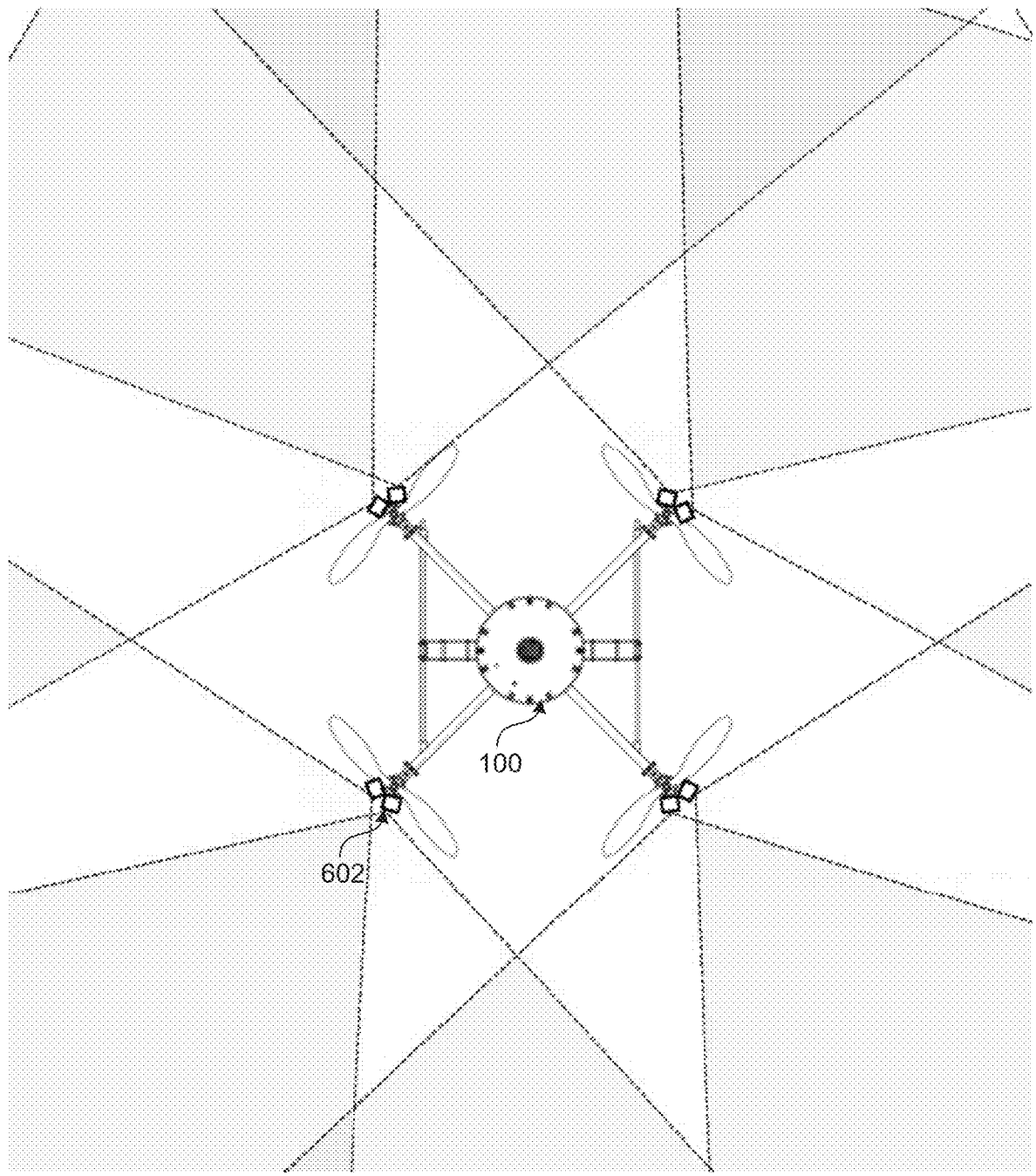
FIG. 6 illustrates an example arrangement of image capture devices coupled to a UAV.

According to some embodiments, UAV 100 may comprise multiple high-resolution image capture devices 602 (e.g. cameras) with spatial offsets from each other, thereby providing the capability to capture an unobstructed view of the physical environment surrounding UAV 100. In some embodiments, image capture devices 602 may be arranged to provide a full 360 degree view around UAV 100, as illustrated in FIG. 6. However, a full 360 degree view may not be necessary in all embodiments. In some embodiments, the image capture devices 602 may be arranged such that at least two cameras are provided with overlapping fields of view, thereby allowing for stereoscopic (i.e. 3D) image/video capture and depth recovery (e.g. through computer vision algorithms) at multiple angles around UAV 100. For example, FIG. 6 shows a high-level illustration of the concept of multiple image capture devices 602 mounted to UAV 100 with overlapping fields of view as represented by the dotted lines. FIG. 6 is provided to illustrate the concept, but does not indicate a particular configuration or geometry as a limitation. According to some embodiments, a UAV in accordance with the present teachings may include more or fewer image capture devices 602. For example, in some embodiments, the individual fields of view of any given image capture device may be expanded through the use of a "fisheye" lens, thereby reducing the total number of image capture devices needed to provide a 360 degree view around UAV 100.

According to some embodiments the position and orientation of each camera may be calibrated to an onboard inertial measurement unit (IMU) by fusing data from the cameras and IMUs in a visual inertial odometry framework.

According to some embodiments, a monocular navigation algorithm may be run for each camera paired with an on-board IMU and as the relative position and orientation calibration is dialed in, stereo correspondence may be performed on observed primitives representing a pair of corresponding image features captured by a pair of cameras in order to provide a more robust estimation of distance to the objects.

Hybrid Mechanical/Digital Gimbal

In some embodiments, UAV 100 includes an image capture adjustment and stabilization system. Capturing images (including video) from a vehicle in motion (such as from a UAV 100) may lead to quality issues such as blur, shake, and disorientation. Image stabilization may generally refer to techniques used to counter these effects and produce a clear stable image even when captured by a vehicle in motion.

A number of techniques and devices for image stabilization are currently known. For example, a multi-axis mechanical gimbal device may, through the use of gyroscopes and mechanical actuators along two or more axis, physically stabilize an image capturing device (e.g. a camera) coupled to a mobile platform. An example of a multi-axis gimbal currently available is the Freefly MoVI™. While effective in certain implementations, multi-axis mechanical gimbals may add significant mechanical and systems complexity as well as weight to a UAV 100. Alternatively, captured digital images may be digitally "stabilized" using digital image processing to manipulate the image. For example, Parrot™ offers a drone with a motion-less 180 degree camera with a fisheye lens. Using post processing and crop filters may result in a "stabilized" image. While effective in certain implementations, full digital image stabilization may reduce image quality due to image sensor resolution limits, and in the case of using crop filters may require capturing more data than is necessary.

Instead a UAV 100, according to some embodiments, may include a hybrid approach comprising mechanical gimbals providing freedom of motion along one or more axes along with real-time image processing (herein referred to as a "digital gimbal"). For example, a single axis mechanical gimbal capable of adjusting the orientation of an image capture device in conjunction with the yaw control of the UAV 100 and digital image processing may produce a full range or image capture from looking straight down from the UAV 100 to the ground to looking straight up from the UAV 100 to the sky while minimizing the mechanical complexity of the stabilization system.

According to some embodiments, a single axis mechanical gimbal, as part of a hybrid approach described above, would adjust the pitch of the image capture device. Adjusting pitch as opposed to roll or yaw, would allow for overall camera range of motion where the UAV 100 is implemented as a rotary vehicle, for example a quadcopter (see e.g. discussion in section titled "Unmanned Aerial Vehicle—Example System" for additional information). This has to do with the way in which the flight of a quadcopter is controlled. Generally, a quadcopter is controlled by varying the orientation of its vertical axis. In other words, in a hover the quadcopter's vertical axis is perpendicular to the ground. In order to move left or right, forwards or backwards, the angular velocity of the four rotors are adjusted, and the quadcopter tilts in the direction that it intends to move. This method of control leaves the quadcopter free to determine yaw, thus effectively "gimbaling" the yaw axis. While using yaw to point at a desired subject may be difficult for a human pilot, it can be accomplished by the UAV's 100 flight control system and the localization techniques described herein. Accordingly, utilizing a pitch gimbal gives maximum possible view range of motion since the yaw of the image capture device is easily controlled by adjusting the yaw of the quadcopter itself and the roll of the image capture device is easily controlled through digital image processing, for example simple image rotation transforms. The hybrid mechanical digital gimbal system described above has been described with a single axis mechanical gimbal, however it shall be appreciated that a hybrid mechanical digital gimbal system for image stabilization and tracking may include mechanical actuation on more than one axis. For example, in an embodiment, a mechanical gimbal is utilized to adjust the pitch and roll of an on-board image capture device with adjustments in yaw accomplished by digitally processing the captured images.

Changes in Position and/or Orientation Relative to a Point of Reference

According to some embodiments, the UAV 100 may maneuver according to an absolute fixed coordinate system. In other words, user inputs and gestures may correspond with an instruction to move to an absolute point in space. The UAV 100 may also maneuver according to a coordinate system relative to a "point of reference." The point of reference may be defined as at or associated with a physical object in the physical environment, for example a human subject 102 and/or a mobile device 104 through which a user (in this case human subject 102) may provide control input. The point of reference may also be another point in space which may be specified via the mobile device 104 by clicking on a location of interest on a map or image. For example, a user 102 viewing a live video feed from UAV 100 through a touch display of mobile device 104 may touch a point or select a displayed object to redefine the point of reference about which motion is defined. Further, the defined point of reference may be stationary (e.g. a building or physical marker) or may be in motion (for example a moving car). For example, if the point of reference is set to a moving car, then any motions by the UAV 100 may be made relative to the car. In other words, if the point of reference is set to be a car moving at 25 mph, then a UAV 100 in "hover"

would actually match the speed of the car while maintaining a constant position/orientation relative to the car. If the UAV 100 received input to move 10 feet in one direction, it would again do so relative to the car's position/orientation at any given moment. A particular point of reference can be tracked using any of the aforementioned systems for localization and navigation. Specifically, in an embodiment, a point of reference can be tracked in a 3D map of the surrounding environment generated using visual inertial odometry with captured stereoscopic images of the surrounding environment.

A relative coordinate system may simplify the motion calculations necessary to maneuver the UAV 100. Further, controlled motions made relative to point of reference associated with a subject 102 or mobile device 104 may allow for more intuitive control of the UAV 100.

Figure 7B:
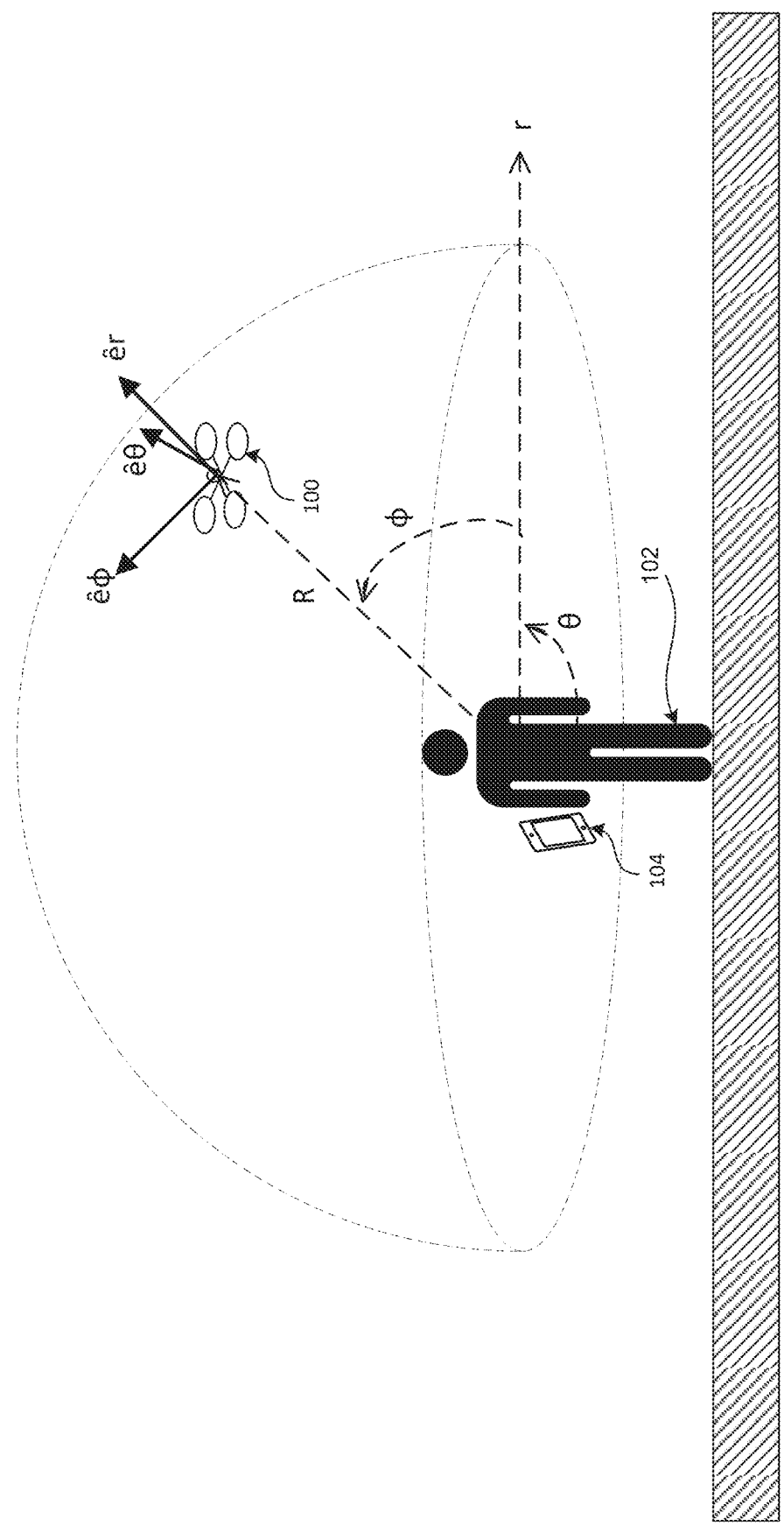
FIG. 7B illustrates an example technique for defining the motion of a UAV relative to a point of reference using a spherical polar coordinate system.

FIGS. 7A-7B Illustrate at a high level how the motion of a UAV 100 may be estimated and/or defined according to different coordinate systems. In FIG. 7A, the motion of an UAV 100 may be estimated and/or defined according to a cylindrical polar coordinate system relative to a point of reference, for example human subject 102 or a mobile device 104 held operated by a user (in this example human subject 102). In such a configuration, a position (and thereby motion) relative to a point of reference may be defined according to the cylindrical polar coordinate system. For example, at any given time, the position of UAV 100 may be defined at a coordinate $(r, \theta, z)$ relative to a point of reference (in this example human subject 102). Further, in some embodiments, generated control commands may cause the UAV 100 to move along the normal tangent to an axial direction z. In other words, a control command, may cause the UAV 100 to accelerate along basis directions $\hat{e}z$ and $\hat{e}\theta$, with no acceleration in the basis direction $\hat{e}r$. Accordingly, in response to the particular control command, UAV 100 may travel along an invisible cylinder at a constant radius R from user 102. Similarly, control commands may cause UAV 100 to accelerate along basis direction $\hat{e}r$ while maintaining constant positions z and $\theta$.

Similarly, as shown in FIG. 7B, the motion of an UAV 100 may be estimated and/or defined according to a spherical polar coordinate system relative to a point of reference, for example human subject 102 or a mobile device 104 held operated by a user (in this example human subject 102). Similar to the example illustrated in FIG. 7A, at any given time, the position of UAV 100 may be defined at a coordinate $(r, \theta, \varphi)$ relative to a point of reference (in this example human subject 102). Further, in some embodiments, in order to maintain a constant separation with the point of reference, generated control commands may cause the UAV 100 to move along basis directions $\hat{e}\varphi$ and $\hat{e}\theta$, with no acceleration in basis direction $\hat{e}r$. Accordingly, in response to the control command, UAV 100 may travel along an invisible spherical plane at a constant radius R from a point of reference (e.g. human subject 102). Similarly, in order to close separation, control commands may cause UAV 100 to accelerate along basis direction $\hat{e}r$.

Calculations for the motion of the UAV 100 in the above described control configurations may be accomplished using relative or absolute coordinate system of any type (Cartesian, polar, cylindrical, etc.), although motion calculations based on an absolute coordinate system may be more processor intensive than if made relative to point of reference (e.g. human subject 102 or mobile device 104). The cylindrical and polar coordinate systems are used here for illustrative purposes to describe more clearly the way in which the UAV 100 may move relative to a reference point (e.g. the human subject 102 or mobile device 104) using the above described techniques.

According to some embodiments, calculation of maneuvers to be performed by the UAV 100 may include implementation of a feed-forward control scheme. For example, as the motion of UAV 100 is continually estimated relative to a subject in motion and an obstacle is detected that will impede a planned path of the UAV 100, the planned path may be continually updated in order to avoid the obstacle. This will allow for smoother transitions between flight maneuvers.

While in flight, the UAV 100 may capture images and or video using one or more on board image capture devices (e.g. and image capture device mounted to a hybrid mechanical-digital gimbal). In some embodiments, image capture may track the same point of reference used for calculating motion (e.g. a human subject 102). Consider an example in which a human subject 102 is the point of reference. Here, the UAV 100 may maneuver around the human subject 102 in response to generated control commands. Similarly, while moving around the point of reference (i.e. the human subject 102), the UAV 100 may adjust the orientation and/or processing of image capture device(s) (e.g. cameras) such that the point of reference (i.e. the human subject 102) remains centered in the field of view of the image capture device(s). Image capture may be adjusted according to techniques previously described, for example, by using a mechanical and/or a hybrid mechanical-digital gimbal system linked to one or more image capture devices.

Figure 8A:
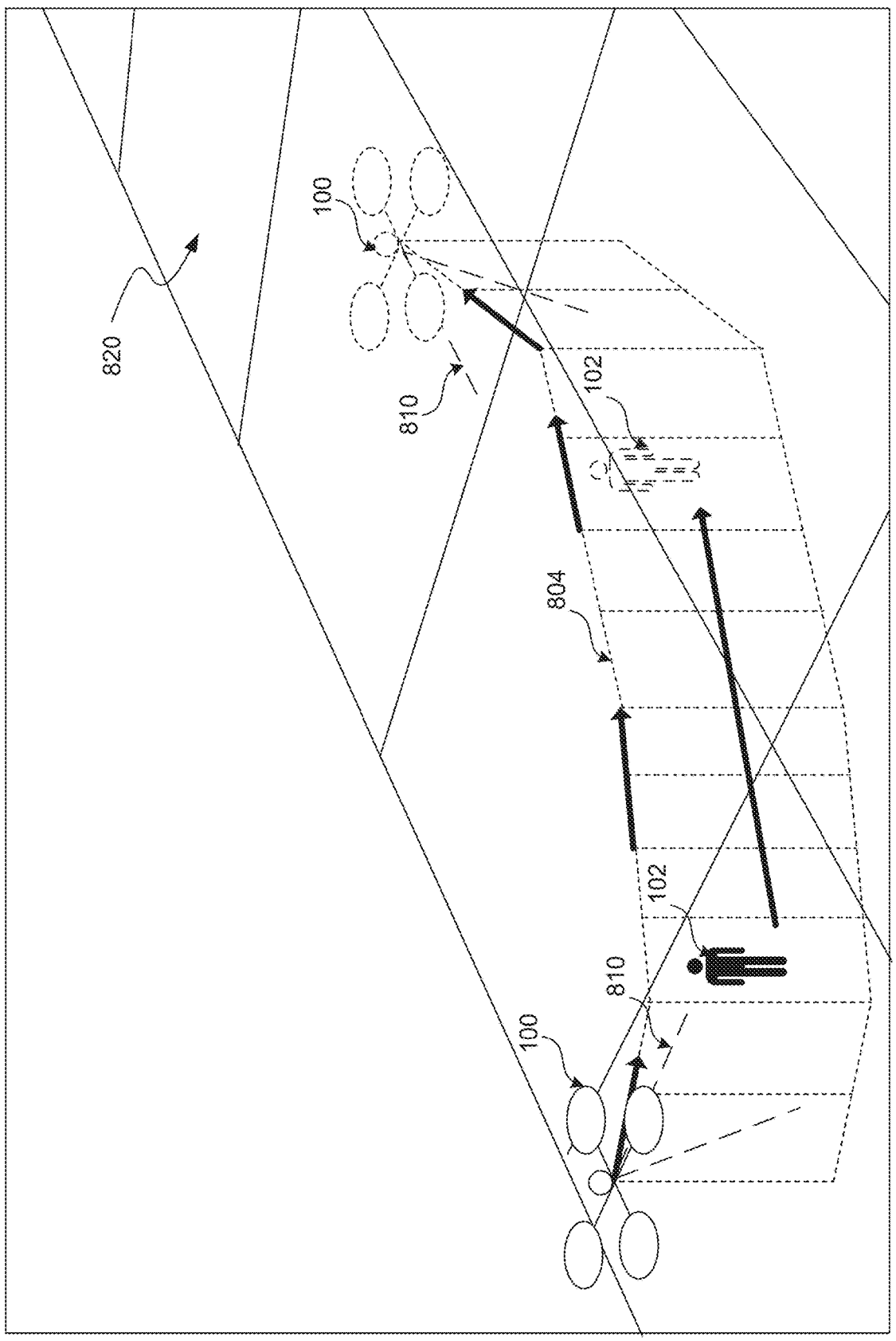
FIG. 8A illustrates an example scenario including a UAV in flight through a physical environment while capturing images of a subject.

Adjusting Image Capture to Satisfy Specified Criteria Related to Image Capture Quality FIG. 8A illustrates an UAV 100 in autonomous flight through a physical environment 802 that may dynamically adjust image capture of a subject (e.g. human subject 102) to satisfy a specified criterion related to a quality of image capture.

As shown in the example illustrated at FIG. 8A, UAV 100 is at current position/orientation (indicated by the solid line drawing of a quadcopter) and is in autonomous flight along a current planned flight path 804 towards a future position/orientation (indicated by the dotted line drawing of the quadcopter). While in flight, UAV may be capturing images (including video) of a subject in the physical environment. In the example shown in FIG. 8, UAV 100 is capturing images of human subject 102 as indicated by the image capture field of view 810. The subject 102 may also be in motion through the physical environment. For example, human subject 102 is shown at a current position/orientation (indicated by the solid drawing of a human subject) and is in motion towards a future position/orientation (indicated by the dotted line drawing of a human subject). As previously described, image capture of the subject may be by one or more image capture devices (e.g. cameras) mounted to UAV 100. In some embodiments, the image capture device(s) may be mounted to a motorized gimbal to enable visual stabilization and/or tracking. As previously described, in some embodiments, the motorized gimbal may be part of a hybrid mechanical-digital gimbal system.

Figure 8B:
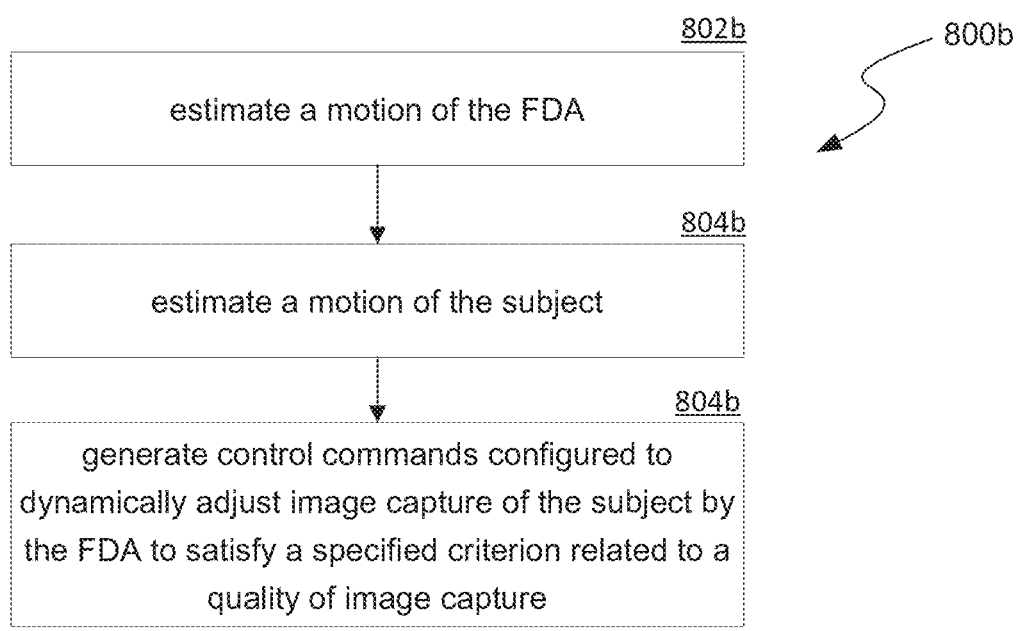
FIG. 8B is a flow chart describing an example process for dynamically adjusting image capture of a subject by a UAV.

FIG. 8B is flow chart of an example process 800b for adjusting image capture by a UAV 100 to satisfy a specified criterion. Process 800b begins at steps 802b and 804b with estimating a motion of the UAV 100 in autonomous flight through a physical environment 820 and estimating a motion of a subject through the physical environment 820. The motion of UAV 100 and subject 102 may be estimated using any of the previously described techniques. For example, in some embodiments, the motions of the UAV 100 and/or subject 102 is estimated based in part on images captured by an image capture device associated with UAV 100. As previously described, the image capture device of UAV 100 may include an array of multiple image capture device (e.g. cameras) providing an view of the surrounding physical environment (including subject 102). In some embodiments the motions of UAV 00 and/or subject 102 may be estimated using a process of visual inertial odometry by combining the captured images with sensor data from one or more inertial measurement units (IMU) onboard the UAV 100 and/or a mobile device 104 held by a human subject 102. It shall be understood that the process of estimating motions may include estimating and tracking position/orientation of the UAV 100 and/or subject 102 over time. Further, it shall be understood that at any given point in time the UAV and or subject may be stationary (i.e. the estimated motion may effectively be zero).

Process 800*b* continues at step 806*b* with in response to estimating the motions of the UAV 100 and the subject 102, generating control commands to dynamically adjust image capture of the subject 102 by the image capture device associated with the UAV 100 to satisfy a specified criterion related to a quality of the image capture. In some embodiments control commands are generated by a flight controller onboard the UAV 100 (for example flight controller 1308 described with respect to FIG. 13). Alternatively, the control commands may be generated by a remote computing device (e.g. a mobile device 104 or any other network-connected computing device) and transmitted to the UAV 100 via a wireless communication link (e.g. WiFi). The one or more specified criteria may be stored as instructions on a memory unit onboard the UAV 100 and/or in a remote computing device (e.g. a mobile device 104). As used in this disclosure, the dynamic adjustment of image capture may include adjusting the characteristics or settings of an image capture device associated with UAV 100, adjusting the orientation of an image capture device associated with UAV 100, adjusting image processing (in real time or post processing), and or adjusting the motion of UAV 100 through the physical environment. For example, in some embodiments the control commands to dynamically adjust image capture may include control commands to adjust any of focus, aperture, shutter speed, light sensitivity (ISO), frame rate, color balance, image framing, or image stabilization by an image capture device associated with UAV 100. As another example, in some embodiments the control commands to dynamically adjust image capture may include control commands to adjust subject tracking and image stabilization using an image capture device mounted to a motorized gimbal, for example a hybrid mechanical-digital gimbal. Further, in some embodiments, the control commands to dynamically adjust image capture may include control commands to adjust the position and/or orientation of UAV 100.

The terms "dynamic" or "dynamically" in this context imply that adjustments are made continually or near continuously as additional data is gathered (e.g. via an array of image capture devices mounted to UAV 100). For example, the subject's motion may continually change, physical objects in the surrounding physical environment may be in motion and present obstacles, characteristics of the physical environment (e.g. weather, lighting, etc.) may change, and or the system may receive direct control inputs from a user. In some embodiments, motion (of the UAV 100 and subject 102) is estimated and a planned flight path and image capture setting for UAV 100 is updated at period time increments in response to new data gathered by one or more sensors (e.g. image capture devices) associated with UAV 100. These increments may be static (e.g. every 1 ms) or may, themselves, dynamically change. For example, in some embodiments, detected changes in the surrounding environment may cue a navigation/localization system to narrow the periodic increments at which motion estimations and image capture adjustments are made to more accurately respond to such changes in the surrounding environment. Alternatively, where the surrounding environment remains relatively static, a navigation/localization system may expand the periodic increments at which motion estimations and image capture adjustments are made so as to conserve power and/or data processing resources.

According to some embodiments, a system in accordance with the present teachings may incorporate additional data when generating control commands to adjust image capture by an UAV 100. For example, the generated control commands may further be based on data such as the geographical location of UAV 100 at the time of capture, the date and time images are captured, etc. For example, a system in accordance with the present teachings may determine (using any of the aforementioned systems for localization) that UAV 100 is capturing images outdoors in the northern hemisphere in the evening during a summer month and may, accordingly adjust generated control commands to better suit those conditions. Similarly, a system in accordance with the present teachings may incorporate data gathered from other sensors associated with UAV 100. For example, an ambient light sensor may gather data that may directly inform a level of ambient light in the physical environment without the need for additional processing of captured images.

As previously described, in response to estimating the motions of the UAV 100 and the subject 102, a computing system (e.g. a flight controller associated with UAV 100) may generate control commands to dynamically adjust image capture to satisfy a specified criterion related to a quality of the image capture. It is generally understood that the quality of image capture in any given situation can depend on a number of different factors. For example, if the image capture is of a particular subject (e.g. a human, an animal, a vehicle, a building, or any other object), a basic determination on the quality of image capture may be whether the subject remains in view, in focus, properly framed, etc. Of course, this determination of what produces a quality image can depend on a number of objective and/or subject image capture quality standards. As described herein, a user may set one or more specified criteria related to image capture quality and based on those one or more criteria, a system in accordance with the present teaching may automatically generate control commands configured to dynamically adjust image capture by a UAV 100 to meet those specified one or more criteria without any direct control input by a user (e.g. remote control).

As mentioned, the specified one or more criteria may be based on subjective and/or objective image capture quality standards. For example, a common objective standard for determining a quality of image capture is the balance of tonal distribution within the captured image. Such distribution can be graphically represented in the form of an image histogram. In an image histogram, the horizontal axis of the graph represents a range of tonal distribution, while the vertical axis represents the number of pixels at that particular tone. What results is a chart conveying information regarding the tonal variation in a given set of image data. For example, an image histogram, having most of its data points on the left side, may indicate a dark underexposed image. Conversely, an image histogram in which most of the data points fall on the right side may indicate a bright and perhaps overexposed image. A more balanced image histogram may therefore indicate a spread of tonal variation indicating greater contrast and therefore a higher quality image. The above example serves only to illustrate that the quality of an image may be based at least in part on certain objective criteria. Some other example of objective standards may be based on the variation in motion of a given shot indicating a steady or unsteady capture, balance of colors in a given shot, color saturation, variation in luminance within a given shot perhaps indicating an optimal or sub-optimal lighting source configuration (e.g. a shot of a subject individual with the sun at their back), focus of the shot, optical flow or any other standards tending to indicate an objective quality of a captured image.

In some embodiments, the specified one or more criteria may be based on subjective image capture quality standards. It will be appreciated that the determined quality of a captured images may often be a matter of individual human perception. For example, aesthetic factors such as the framing of a shot, the sequencing of multiple shots, the orientation of a subject within a shot, or the background objects that share the shot with the subject may be perceived differently from one human to the next as indicating a higher quality or lower quality shot. This presents an issue when specifying criteria upon which to base control commands configured to adjust image capture by a UAV 100. To address this issue, in some embodiments, subjective image quality standards may be based at least in part on polling and/or statistical methods applied to historical data to arrive at subjective standards that approximate generally held views of image quality.

As an illustrative example, based on historical data (e.g. user reviews of sets of captured images) it may be determined that framing a subject within a shot according to the so called "golden ratio" (i.e. 1 to 1.618) produces an image of subjectively higher quality that an image with a perfectly centered subject. With this in mind, a criterion may be specified that is related to this golden ratio-based subjective standard of image quality. For example, in response to estimating the motions of UAV 100 and a subject 102, a system in accordance with the present teachings may generate control commands configured to adjust image capture (including maneuvering the UAV 100 relative to subject 102) so as to achieve a composition roughly in line with the golden ratio thereby satisfying the specified criterion.

According to some embodiments, subjective image quality standards may be based on existing statistical data. For example, a poll may be held in advance amongst a set of leading cinematographers or photographers. Their subjective input into the components of a high-quality image may then inform the standards upon which the one or more criteria are based. Such an implementation would in essence place a virtual expert cinematographer/photographer in control of the image capture capabilities of an UAV 100.

In some embodiments, subjective image quality standards may be based on continually gathered data associated with image quality and thereby continually evolve, for example by using machine learning algorithms. Consider the following example; multiple UAVs located around the world, may capture images that are then uploaded to a third-party social networking platform. The multiple users, forming a community on the social networking platform, may view each other's uploaded images and provide feedback (e.g. in the form of comments, upvotes, likes, etc.). Such a system may then aggregate the community feedback data with analyses of the uploaded images/video in order to inform and adjust the specified one or more criteria by which image capture adjustments are made for a given UAV 100. As mentioned, machine learning algorithms may be applied to the gathered community feedback data to define certain subjective image quality standards.

Returning to FIG. 8A, in the described context an objective image capture quality standard may be (as previously described) to keep the subject in the field of view and in focus. For example, consider again the scenario illustrated in FIG. 8A. A UAV 100 at a current position (as indicated by solid line quadcopter) is in autonomous flight a human subject 102 located in a physical environment 820. Both UAV 100 and human subject 102 may be in motion or stationary. At a most basic level, the specified criterion in this context may simply be to keep the human subject 102 in view of an image capture device of UAV 100. The specified criterion itself may include certain rules that must be met (within tolerance) to satisfy the criterion. For example, in the case of specified criterion to keep the subject "in view," the criterion may be met as long as the image capture device captures the subject while the UAV 100 is no more than 100 meters from the subject. Similarly, set tolerances may define permissible limits non-adherence to these rules. For example, a set tolerance may be based on a temporal aspect (e.g. the subject 102 can fall out of view for no more than 2 seconds). In response to estimating motions of the UAV 100 and subject 102, a system (e.g. a flight controller) may generate commands configured to adjust image capture by the UAV 100 to keep the human subject 102 in view. For example, as shown in FIG. 8A, human subject 102 is in motion to a future location (as indicated by the dotted line human subject). Here, given the current motions of UAV 100 and human subject 102, the control commands configured to keep the subject in view may include control commands to autonomously fly along a planned flight path 804. Again, planned flight path 804 represents an instantaneous planned flight path given the current sensor data available. At a subsequent time step, this planned flight path may be adjusted (e.g. based on changes in the motion of the UAV 100 and/or subject 102 or the introduction of another physical obstacle) to satisfy the specified criterion of keeping the subject 102 in view.

In some embodiments, motion planning for travel along a planned flight path (e.g. flight path 804) may involve a technique generally referred to as "feed-forward" control. In other words, control commands may be generated (and continually updated) in anticipation of maneuvers needed to maintain autonomous flight along the current planned flight path. For example, consider planned flight path 804 shown in FIG. 8A. From the current position of UAV 100 (e.g. as indicated by the solid line quadcopter), a system in accordance with the present teachings may generate control commands that anticipate the various maneuvers needed to fly along the sweeping arc of flight path 804 and decelerate to arrive at a stopping position (e.g. future position indicated by the dotted line quadcopter). As mentioned, planned flight path 804 represents the current planned flight path at a given time. The planned flight path 804 may be continually adjusted (or at least adjusted at time intervals) to adjust image capture to satisfy a specified criterion.

Given the idealized physical environment 820 illustrated in FIG. 8A and assuming that the only specified criterion is to keep the human subject 102 in view, the system generating the control commands may have multiple options for dynamically adjusting image capture by the UAV 100 to meet the specified criterion. For example, control commands may be generated that cause UAV 100 to simply follow human subject 102 at a constant distance (or at least within a maximum separation distance) while maintaining a constant altitude (or at least above a minimum altitude). Alternatively, control commands may be generated that cause UAV 100 to fly past human subject 102 while an image capture device configured for active tracking (e.g. using a hybrid mechanical-digital gimbal) is adjusted to keeps the subject 102 in the field of view 810, as illustrated in FIG. 8A. As will be described, the specified one or more criteria may include further constraints.

Figure 9:
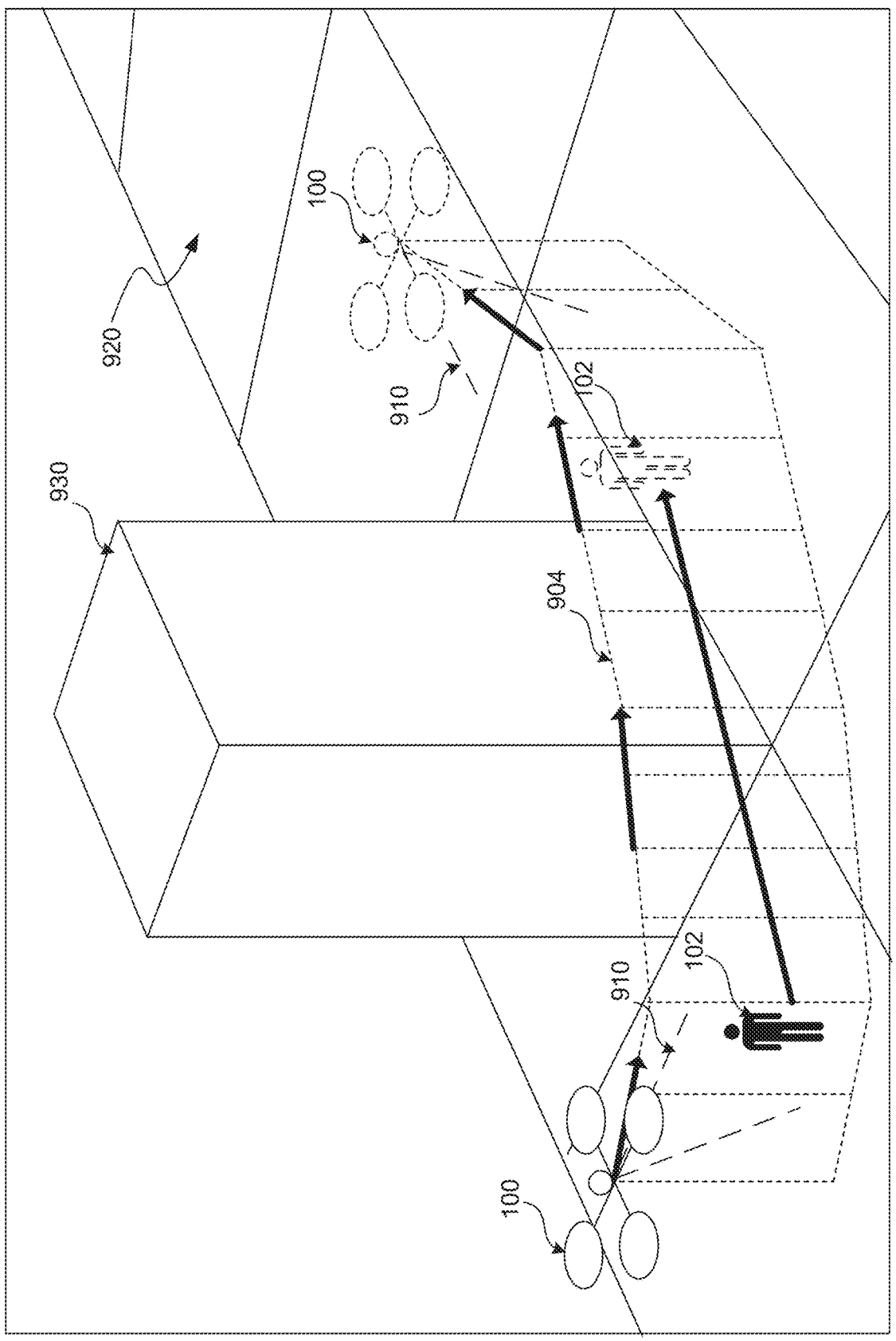
FIG. 9 illustrates an example scenario including a UAV adjusting image capture of a subject to avoid a collision with another object.

In some embodiments, a criterion may be specified to keep the subject in view while avoiding a collision with another object in the physical environment. FIG. 9 shows an example scenario involving a UAV 100 in flight over a physical environment 920 and capturing images of a human subject 102. As shown in FIG. 9, UAV 100 may be in autonomous flight along a current planned flight path 904 to maneuver to avoid a collision with another object 930 in the physical environment while keeping human subject 102 in view (as indicated by field of view lines 910. The example illustrated in FIG. 9 is idealized and shows a relatively large stationary object 930 (for example a building or other structure), but the same concepts may apply to avoid smaller mobile objects such as a bird in flight. As shown in FIG. 9, based on the estimated motions of UAV 100 and subject 102, a system in accordance with the present teachings may generate control commands to dynamically adjust image capture includes by generating control commands to maneuver UAV 100 along flight path 904 to avoid object 930 while keeping human subject in view (as indicated by field of view lines 910). Notably, this illustrates that the addition of another constraint to the specified criterion (i.e. avoiding a collision) narrows the number of possible flight paths UAV 100 can take while still satisfying the specified criterion. For example, because the human subject 102 is moving to the right of object 930 and based on the characteristics of object 930, in order to keep human subject 102 in view, UAV 100 must also maneuver to the right of object 930. Any of the previously described localization techniques may be utilized to detect the presence of the object 930 with relation to human subject 102 and/or UAV 100 and to generate control commands configured to cause UAV 100 to avoid a collision with object 930. For example, in some embodiments, based in part on images captured by an array of image capture devices mounted to UAV 100 and using a process of visual inertial odometry, the geometry and position/orientation of object 930 relative to UAV 100 may be determined.

Figure 10:
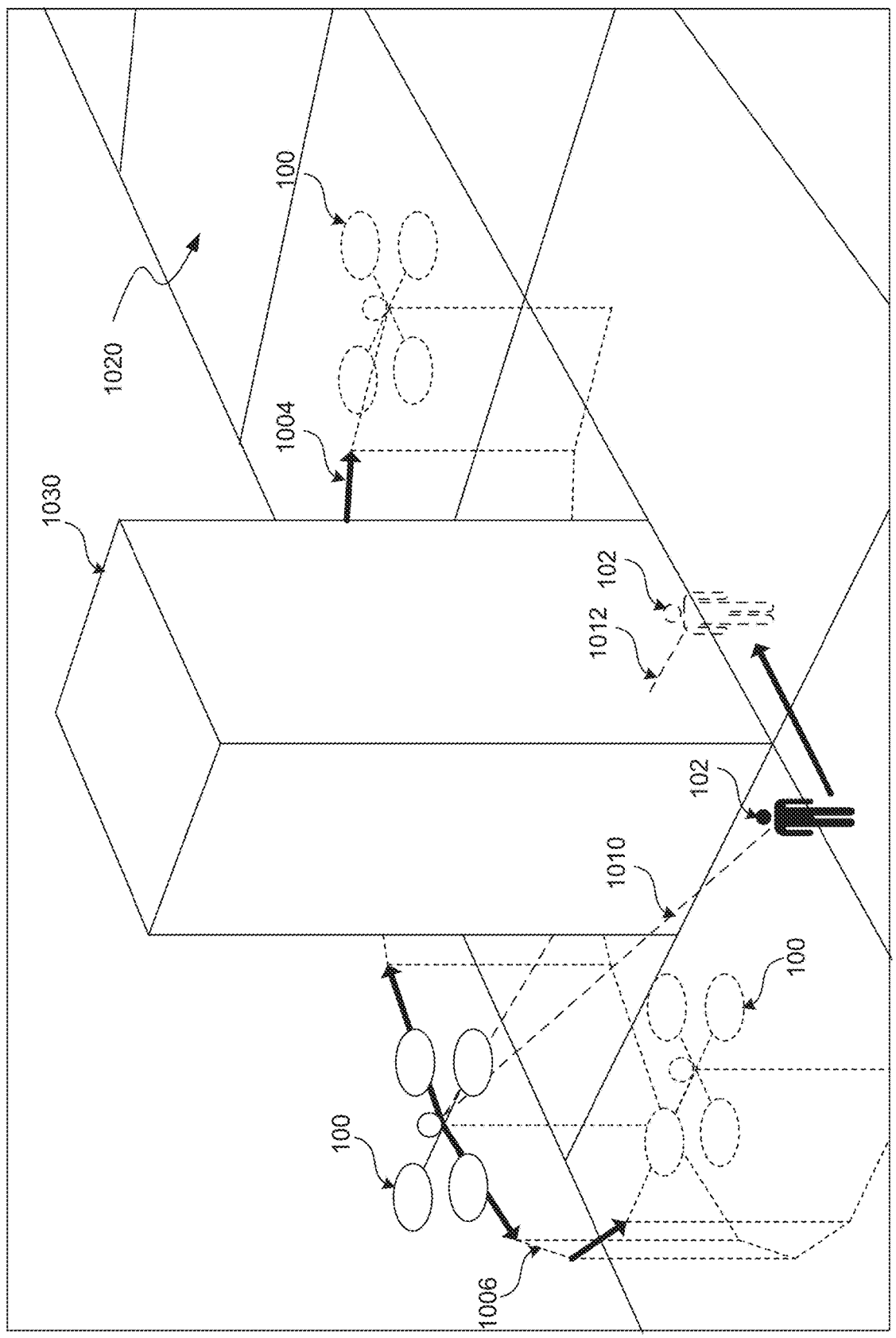
FIG. 10 illustrates an example scenario including a UAV adjusting image capture to keep a subject in view.

In some embodiments, a criterion may be specified to keep the subject in view and the image captured image unobstructed by another object in the physical environment. Similar to FIG. 9, FIG. 10 shows an example scenario involving a UAV 100 in flight over a physical environment 1020 and capturing images of a human subject 102. As shown in FIG. 10, at a current time, human subject 102 is located on an opposite side of object 1010 from UAV 100 but is within a field of view of UAV 100 as indicated by the line of sight 1010 connecting the solid line UAV 100 to the solid line subject 102. Based on the estimated motion of human subject 102 (as indicated by the arrow pointing away from human subject 102), it may be determined that at a future time, human subject 102 may be located on the opposite side of object 1030 and not in view of UAV 100 (assuming UAV 100 remains stationary) as indicated by the obstructed line of sight line 1012 connecting the solid line UAV 100 to the dotted line subject 102. Based on this predicted obstruction, a system in accordance with the present teachings may generate control commands configured to adjust image capture to keep subject 102 in view and unobstructed in order to satisfy the specified criterion. Here, the generated control commands may include control commands configured to cause UAV 100 to maneuver along a flight path 1006 to keep the view of human subject 102 unobstructed. Note that in this example, simply avoiding a collision with object 1030 may not be sufficient to satisfy the specified criterion. For example, if the generated control commands cause UAV 100 to maneuver along alternative flight path 1004 instead of 1006, its view of human subject 102 will become momentarily obstructed by object 1030.

As with FIG. 9, the example illustrated in FIG. 10 is idealized and shows a relatively simple stationary object 1030 (for example a building or other structure). In this example, a specified criterion to avoid collision with the object may produce the same or similar results as a specified criterion to keep the view unobstructed. In other words, in both situations, UAV 100 may maintain a maximum separation distance while maneuvering to both avoid a collision with an object and keep the view unobstructed. However, consider an example with an object having more complex features such as a tree with sparse canopy cover. Here, if a criterion is specified to keep the subject in view while avoiding contact with the tree, a system in accordance with the present teachings may generate control commands configured to cause UAV 100 to fly over the tree while tracking the human subject 102 walking under the tree. Collision is avoided and because the canopy is sparse, the subject 102 remains in view. However, this will still result in poor image capture because the view of the subject 102 will be obstructed by intermittent leaves. Instead, if a criterion is specified to keep the view of the subject unobstructed, the system may instead generate control commands configured to cause UAV 100 to rapidly reduce its altitude to drop below the canopy of the tree and to continue to track human subject 102. In such an example, UAV 100 may increase its altitude again once human subject 102 has emerged from under the canopy of the tree.

As previously discussed, in some embodiments, the estimated motion of UAV 100 and subject 102 may be based in part on localization data relative to a computer-generated 3D map. For example if a pre-generated 3D map of the surrounding physical environment is available, the motions of UAV 100 and/or subject 102 relative to the 3D map may be estimated using any of the previously described localization techniques. Alternatively, if a pre-generated 3D map is not available, systems in accordance with the present teachings may continually generate and update a 3D map of the physical environment while the UAV 100 is in flight through the environment through a process sometimes referred to as SLAM (simultaneous localization and mapping). Again, as previously discussed, such a 3D map may be generated using a process of visual inertial odometry based in part on images captured by an image capture device associated with UAV 100.

In embodiments in which the motions of UAV 100 and subject 102 are estimated within a representative virtual 3D map of the physical environment, a system in accordance with the present teaching may define, within the 3D map, a virtual line between a virtual representation of an estimated position of the subject 102 and a virtual representation of an estimated position of the UAV 100. Here, if a criterion is specified to keep the view of subject 102 unobstructed by other objects, the system may generate control commands configured to cause UAV 100 to fly a path such that the virtual line does no not intersect a virtual representation of another physical object. Again, this criterion may be specified with a certain tolerance to account for objects in motion. In other words, if UAV 100 and/or subject 102 are both in motion, it may be inevitable that at certain times the virtual line connecting their representations in the virtual map may intersect representations of other objects. However, if that intersection persists for more than a certain period of time (e.g. 1 ms), the system may respond by generating control commands configured to cause UAV 100 to maneuver to avoid the intersection. Consider again the example scenario illustrated in FIG. 10. Sight line 1010 may represent the virtual line connecting the representations of UAV 100 and subject 102 within a virtual environment (i.e. representative of physical environment 1020). As human subject 102 begins to move within the physical environment (as shown by the arrow in FIG. 10), the virtual line 100 connecting the virtual representations moves as well. Eventually, as human subject 102 moves behind object 1030, the virtual line 1010 within the 3D map intersects the corner of a virtual representation of physical object 1030. This intersection thereby causes the system to generate control commands configured to cause UAV 100 to maneuver to avoid the intersection. For example, the motion of the virtual line can be tracked and it may be determined that in order to avoid the intersection, UAV 100 should maneuver along flight path 1006 as opposed to flight path 1004 to keep the view of subject 102 unobstructed. This above described method also works to avoid obstruction by more complex objects. Consider again the example of a tree with sparse canopy cover. Here, the generated 3D map may be a voxel map configured to approximate the more complex objects in the physical environment. For example, virtual representation of the tree may include a number of virtual volumetric elements (i.e. voxels) representing the branches and leaves.

At any given time, the virtual line may intersect with multiple virtual representations of objects, particularly in real world situations with multiple complex objects populating the physical environment. In other words, multiple points of intersection can be detected along the virtual line at a given time. Accordingly, to maintain line of sight, a flight path can be calculated to avoid visual obstruction by the multiple intersecting objects. This flight path can be relatively simple (for example similar to the arc of flight path 1006) to avoid clusters of multiple objects (e.g. the leaves forming the canopy cover of a tree) or may include multiple complex maneuver intended to avoid visual obstruction caused by the multiple objects indicated by the multiple intersection points (e.g. multiple trees between a UAV 100 and subject 102).

In some situations, intersection points along a virtual line can be analyzed differently depending on their distance from UAV 100. Motion by a UAV 100 generally has a greater impact on resolving visual obstruction caused by objects that are closer to the UAV 100. This of course depends on the size and/or shape of the obstructing object, however in general relatively minor maneuvers by UAV 100 may be sufficient to maintain line of sight with a subject around an object that is close to UAV 100. Conversely, more drastic maneuvers by UAV 100 may be necessary to maintain line of sight around an object that is closer to subject 102. This makes sense when again considering the scenario described in FIG. 10. Although described as a single object 1030, the virtual representation of object 1030 can also be described as multiple surfaces that intersect the virtual line at multiple points. For example, obstructed line of sight line 1012 intersects a first surface of object 1030 that faces UAV 100 at a first point and a second surface of object 1030 that faces a future position of subject 102 at a second point. A minor maneuver along flight path 1006 may be sufficient such that sight line 1012 no longer intersects the first surface (i.e. the surface closest to UAV 100) at the first point. However, a more extended maneuver along flight path 1006 may be necessary before sight line 1012 no longer intersects the second surface (i.e. the surface closest to subject 102) at the second point, thereby establishing line of sight with subject 102.

In some embodiments a specified criterion (e.g. to maintain line of sight with a subject) can be applied or combined with inputs by a user. For example, consider a human user operating controlling UAV 100 using a device 104. The user inputs control commands via device 104 that are transmitted to UAV 100 causing it to maneuver through the physical environment in much the same way a remote control system operates. However, a control criterion may be specified and applied to any input control commands to maintain line of sight with a subject 102 (e.g. the user). In other words, UAV 100 may maneuver according to the user's direct control commands but may adjust certain maneuvers to maintain line of sight with a subject despite these control commands. In some embodiments, the specified criterion can be applied to modify direct control commands from a user. Alternatively, user inputs can be combined with motion estimations of the UAV 100 and/or subject 102 to generate control commands that closely approximate maneuvers intended by the user input while satisfying a given specified criterion (e.g. line of sight).

This application of specified criterion such as maintaining line of sight to user inputs can be particularly useful where certain flight regulations are enforced. For example, the Federal Aviation Administration (FAA) and Department of Transportation (DOT) are currently in the process of finalizing flight regulations applicable to certain UAVs that require that a remote operator (i.e. a user) maintain visual contact with the UAV at all times. A simple control restraint on separation distance may be helpful to an extent in enforcing a line of sight regulation. For example, a UAV can be configured so that it is never outside a maximum separation distance from an associated control device. However, such a constraint will not account for situations in which line of sight is obstructed by objects within the maximum separation distance. Instead, using the aforementioned techniques, line of sight regulations may be more effectively and automatically enforced.

In some embodiments a criterion may be specified to adjust image capture according to a predefined script to suit a particular type of scene being captured. For example, in some embodiments, in response to the determined motions of the UAV 100 and subject 102, a system may generate control commands configured to cause the UAV 100 to fly a pre-scripted flight path and/or capture images using predefined settings. Here the pre-scripted flight path and/or image capture settings may be based on one or more objective and/or subject image quality standards. As an illustrative example, it may be subjectively desirable to perform certain pre-scripted flyover shots where the subject being captured is part of a scene with a high level of action.

Figure 11:
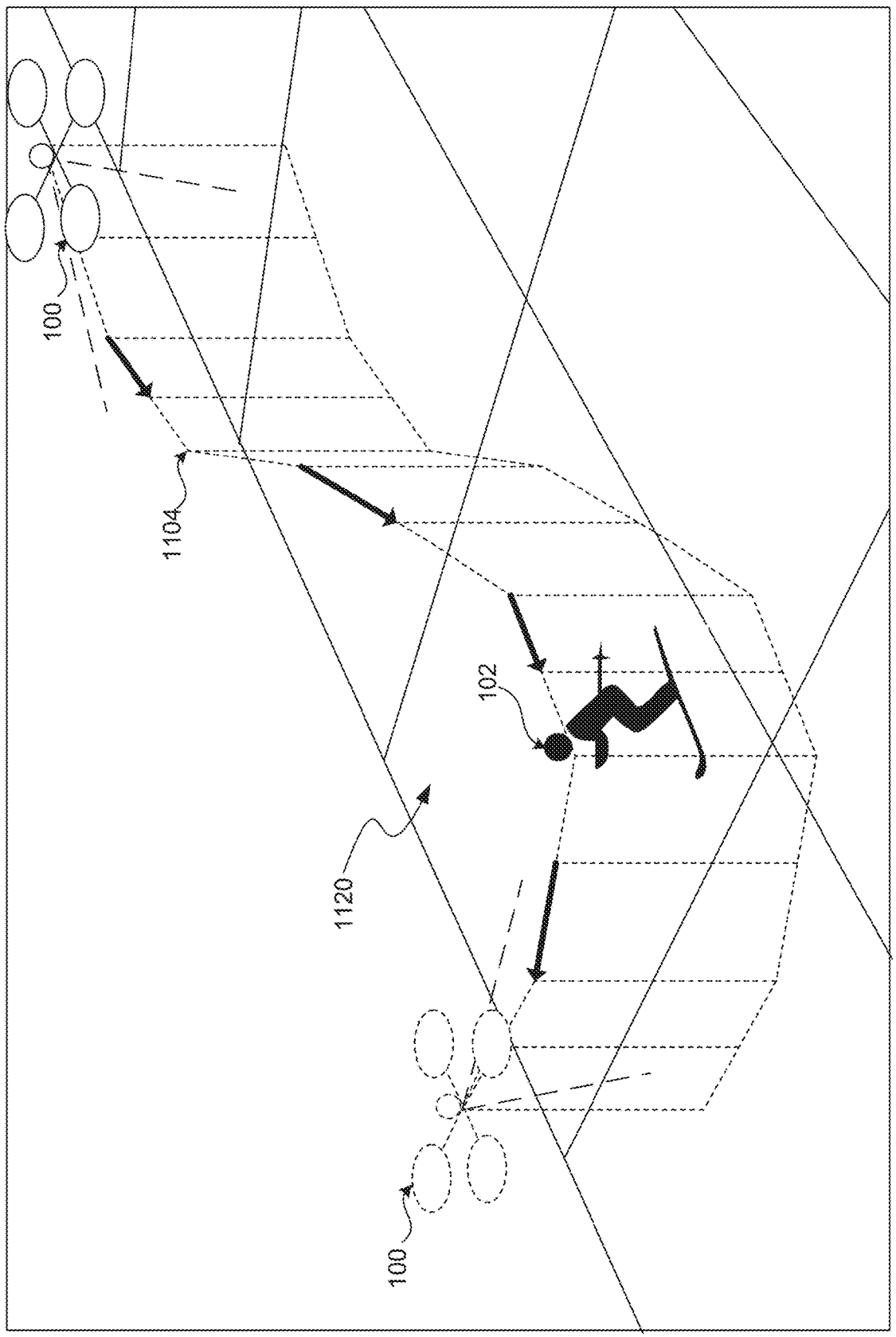
FIG. 11 illustrates an example scenario including a UAV adjusting image capture of a subject according to a predefined flight path.

Consider the example scenario illustrated in FIG. 11. As shown in FIG. 11, a UAV 100 is in autonomous flight over a physical environment 1120 while tracking and capturing images of a human subject 102. Here, human subject 102 is shown as a skier traveling down a mountainside. Based on a specified criterion, and in response to estimating the motions of UAV 100 and subject 102, control commands may be generated that include control commands configured to cause UAV 100 to fly pre-scripted flyover path 1104 over human subject 102 to capture subjectively high-quality action-based video of human subject 102. Again, adjustments in image capture may be made dynamically in response to the changing motions of UAV 100 and/or subject 102. In the scenario illustrated in FIG. 11, consider a situation in which after having flown pre-scripted flight path 1104, the subject 102 then skis off a jump and performs an acrobatic maneuver in mid-air. In response to the newly estimated motions of the UAV 100 and subject 102, and in order to satisfy the specified criterion, control commands may be generated that are configured to cause UAV 100 to fly an alternative pre-scripted flight path (not shown). For example, in order to capture the action of the mid-air maneuver by the human subject 102, control commands may be generated to cause UAV 102 to quickly fly under subject 102 while tracking image capture of subject 102. Alternatively, or in addition to flying according to a pre-scripted flight path, control commands may be generated that adjust certain characteristics or settings of the image capture device to deliver subjectively higher quality image capture. For example, using the scenario illustrated in FIG. 11, subjective image quality standards for capturing downhill skiing scenes may dictate that the image capture device be set to, for example, a certain focal length, shutter speed, white balance, exposure, etc.

In some embodiments, in addition to estimating the motions of UAV 100 and subject 102, a system in accordance with the present teachings may automatically determine (based in part on those estimated motions) the type of scene being captured. For example, a process for determining the type of scene being captured may include first identifying the subject 102 in the physical environment. In the aforementioned embodiments, the subject 102 is described as a general object (human or otherwise) that is the focus of image capture by UAV 100. Tracking of a subject 102 may require differentiating the subject as a discrete object apart from its surroundings, but does not necessarily require identifying what the subject 102 is. In some embodiments, this process of identifying the subject 102 may include comparing (in real time or near real time) captured images of the subject 102 against stored 2D and/or 3D appearance models to determine the type of object subject 102 most closely matches. The level of categorization can depend here. For example, it may be enough to simply identify the subject as human. Alternatively, the subject can be identified as particular type of human subject (e.g. a skier), or even as a particular individual (e.g. champion downhill skier, John Doe).

Once the subject is identified, the process may continue by determining based on the identification of the subject 102 and the estimated motion of the subject 102 that the image captured by UAV 100 of the subject 102 is intended for a particular type of scene. Note that this process of determining that image capture is intended for a particular type of scene may also involve first identifying other objects in the physical environment. Again, consider the scenario described with respect to FIG. 11. Based on a comparison of captured images of subject 102 against stored appearance models, a system may identity subject 102 as a skier. Further, based on a comparison of captured images of other objects against stored appearance models, the system may identify those other objects as, for example, other skiers, snowcapped mountains, trees, etc. Based at least in part on the identification of the subject as a skier, an estimated motion of the subject, and perhaps identification of other objects (e.g. mountains, trees, etc.), the system may determine that the scene being captured is a downhill ski scene.

Having determined that the scene being captured is a particular type of scene (e.g. a downhill ski scene), and in order to satisfy the specified criterion, the system may generate control commands configured to cause UAV 100 to fly a pre-scripted flight and/or adjust certain characteristics or settings of the image capture device based on the particular type of scene.

Figure 12:
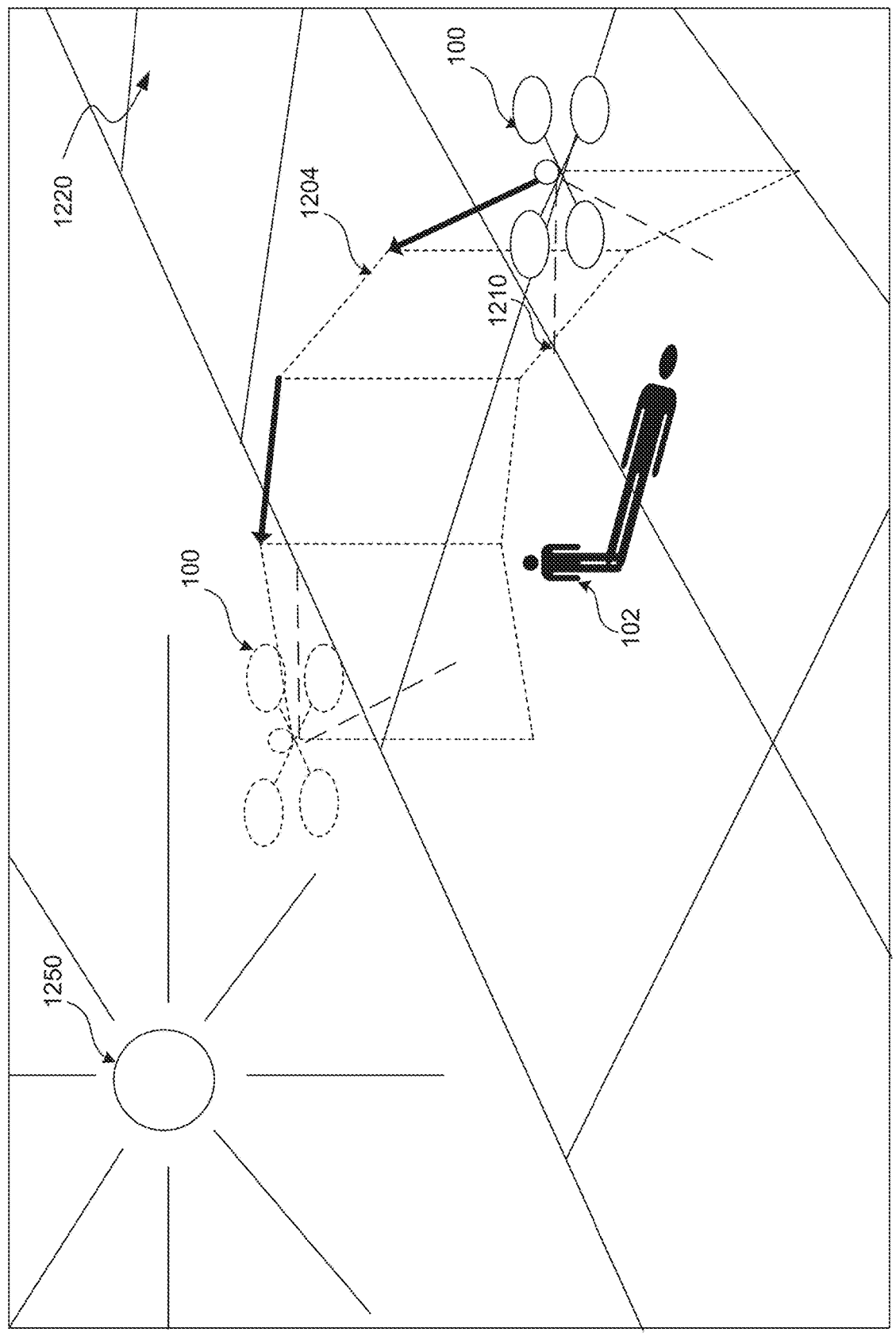
FIG. 12 illustrates an example scenario including a UAV adjusting image capture of a subject to avoid backlighting.

In some embodiments, a criterion may be specified to keep avoid backlighting of the captured subject. Consider the example scenario illustrated in FIG. 12. As shown in FIG. 12, a UAV 100 is in autonomous flight over a physical environment 1220 while tracking and capturing images of a human subject 102. The human subject 102 is lit by a light source 1250 from one side, in this example the Sun. Here, UAV 100 is shown at a current location (as indicated by the solid line quadcopter) opposite the light source 1250 relative to the human subject 102. At this current position, images capture of human subject 102 (for example within field of view 1210) are likely to be devoid of much detail of human subject 102 due to the shadow cast by the light source 1250. In the case of a powerful light source 1250 such as the Sun, the captured images may be completely washed out due to over exposure, particularly if the image capture device associated with UAV 100 is oriented so as to be pointed substantially in the direction of the light source 1250. While perhaps based on a subjective standard, backlight image capture such as this is generally understood to result in poor quality images.

According, in some embodiments, a criterion specified to avoid backlighting, a system in accordance with the present teachings may generate control commands configured such that, at a given time, the UAV 100 is positioned substantially between the light source and the subject 120 so as to avoid backlighting in the images captured of the subject 102. A method for generating such command may include, in addition to estimating the motions of UAV 100 and subject 102, also estimating a position of a light source. This may be accomplished in a number of ways for example, by processing images captured by an image capture device associated with UAV 100 and/or based on localization data of known light sources (e.g. the Sun). Given global positioning information for UAV 100 and the current date/time, a localization system can determine if UAV 100 is pointed towards the Sun while capturing images of a subject 102.

Consider again the example scenario illustrated in FIG. 12. Here, because UAV 100 is located opposite a major light source 1250 while capturing images of subject 102, in order to satisfy the specified criterion, a system in accordance with the present teachings may generate control commands configured to cause UAV 100 to autonomously maneuver along flight path 1204 until, at a future time, UAV 100 is located substantially between light source 1250 and subject 102 (as indicated by the dotted line quadcopter).

Unmanned Aerial Vehicle—Example System

A UAV 100, according to the present teachings, may be implemented as any type of unmanned aerial vehicle. An Unmanned Aerial Vehicle (UAV), sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along means for propulsion (e.g. propeller, jet) to achieve lift. Alternatively, similar to helicopters, UAVs may directly use the means for propulsion (e.g. propeller, jet, etc.) to counter gravitational forces and achieve lift. Propulsion-driven lift (as in the case of helicopters) offers significant advantages in certain implementations, for example as a mobile filming platform, because it allows for controlled motion along all axis.

Multi-rotor helicopters, in particular quadcopters, have emerged as a popular UAV configuration. A quadcopter (also known as a quadrotor helicopter or quadrotor) is a multirotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, the first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g. adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on horizontal plane.

FIG. 13 shows a diagram of an example UAV system 1300 including various functional system components that may be part of a UAV 100, according to some embodiments. UAV system 1300 may include one or more means for propulsion (e.g. rotors 1302 and motor(s) 1304), one or more electronic speed controllers 1306, a flight controller 1308, a peripheral interface 1310, a processor(s) 1312, a memory controller 1314, a memory 1316 (which may include one or more computer readable storage mediums), a power module 1318, a GPS module 1320, a communications interface 1322, an audio circuitry 1324, an accelerometer 1326 (including subcomponents such as gyroscopes), an inertial measurement unit (IMU) 1328, a proximity sensor 1330, an optical sensor controller 1332 and associated optical sensor(s) 1334, a mobile device interface controller 1336 with associated interface device(s) 1338, and any other input controllers 1340 and input device 1342, for example display controllers with associated display device(s). These components may communicate over one or more communication buses or signal lines as represented by the arrows in FIG. 13.

As mentioned earlier, piloting input may be provided wirelessly by a user 102 on the ground or in another vehicle via remote control or portable multifunction device 104.

UAV system 1300 is only one example of a system that may be part of a UAV 100. A UAV 100 may include more or fewer components than shown in system 1300, may combine two or more components as functional units, or a may have a different configuration or arrangement of the components. Some of the various components of system 1300 shown in FIG. 13 may be implemented in hardware, software or a combination of both hardware and software, including one or more signal processing and/or application specific integrated circuits. Also, UAV 100 may include an off-the-shelf UAV (e.g. a currently available remote-controlled quadcopter) coupled with a modular add-on device (for example one including components within outline 1390) to perform the innovative functions described in this disclosure.

As described earlier, the means for propulsion 1302-1304 may comprise a fixed-pitch rotor. The means for propulsion may also be a variable-pitch rotor (for example, using a gimbal mechanism), a variable-pitch jet engine, or any other mode of propulsion having the effect of providing force. The means for propulsion 1302-1304 may include a means for varying the applied thrust, for example via an electronic speed controller 1306 varying the speed of each fixed-pitch rotor.

Flight Controller 1308 (sometimes referred to as a "flight control system" or "autopilot") may include a combination of hardware and/or software configured to receive input data (e.g. sensor data from image capture devices 1334), interpret the data and output control commands to the propulsion systems 1302-1306 and/or aerodynamic surfaces (e.g. fixed wing control surfaces) of the UAV 100. Alternatively, or in addition, a flight controller 1308 may be configured to receive control commands generated by another component or device (e.g. processors 1312 and/or a separate computing device), interpret those control commands and generate control signals to the propulsion systems 1302-1306 and/or aerodynamic surfaces (e.g. fixed wing control surfaces) of the UAV 100

Memory 1316 may include high-speed random-access memory and may also include non-volatile memory, such as one or more magnetic disk storage devices, flash memory devices, or other non-volatile solid-state memory devices. Access to memory 1316 by other components of system 1300, such as the processors 1312 and the peripherals interface 1310, may be controlled by the memory controller 1314.

The peripherals interface 1310 may couple the input and output peripherals of system 1300 to the processor(s) 1312 and memory 1316. The one or more processors 1312 run or execute various software programs and/or sets of instructions stored in memory 1316 to perform various functions for the UAV 100 and to process data. In some embodiments, processors 1312 may include general central processing units (CPUs), specialized processing units such as Graphical Processing Units (GPUs) particularly suited to parallel processing applications, or any combination thereof.

In some embodiments, the peripherals interface 1310, the processor(s) 1312, and the memory controller 1314 may be implemented on a single integrated chip. In some other embodiments, they may be implemented on separate chips.

The network communications interface 1322 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet.

Communication may be facilitated over wired transmission media (e.g. via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 1324, including the speaker and microphone 1350 may provide an audio interface between the surrounding environment and the UAV 100. The audio circuitry 1324 may receive audio data from the peripherals interface 1310, convert the audio data to an electrical signal, and transmits the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmits the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals of UAV 100, such as an optical sensor system 1334, the mobile device interface 1338, and other input/control devices 1342, to the peripherals interface 1310. The I/O subsystem 1360 may include an optical sensor controller 1332, a mobile device interface controller 1336, and other input controller(s) 1340 for other input or control devices. The one or more input controllers 1340 receive/send electrical signals from/to other input or control devices 1342.

The other input/control devices 1342 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to the user 102. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1316) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

The mobile device interface device 1338 along with mobile device interface controller 1336 may facilitate the transmission of data between a UAV 100 and a mobile device 104 (for example, in use as a control device by a user). According to some embodiments, communications interface 1322 may facilitate the transmission of data between UAV 100 and a mobile device 104 (for example, where data is transferred over a local Wi-Fi network).

UAV system 1300 also includes a power system 1318 for powering the various components. The power system 1318 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in computerized device.

UAV system 1300 may also include one or more image capture devices 1334. FIG. 13 shows an image capture device 1334 coupled to an image capture controller 1332 in I/O subsystem 1360. The image capture device 1334 may include one or more optical sensors. For example, image capture device 1334 may include a charge-coupled device (CCD) or complementary metal-oxide semiconductor (CMOS) phototransistors. The optical sensors of image capture device 1334 receive light from the environment, projected through one or more lens (the combination of an optical sensor and lens can be referred to as a "camera") and converts the light to data representing an image. In conjunction with an imaging module located in memory 1316, the image capture device 1334 may capture images (including still images and/or video). In some embodiments, an image capture device 1334 may include a single fixed camera. In other embodiments, an image capture device 13340 may include a single adjustable camera (adjustable using a gimbal mechanism with one or more axes of motion). In some embodiments, an image capture device 1334 may include a camera with a wide-angle lens providing a wider field of view. In some embodiments, an image capture device 1334 may include an array of multiple cameras providing up to a full 360 degree view in all directions. In some embodiments, an image capture device 1334 may include two or more cameras (of any type as described herein) placed next to each other in order to provide stereoscopic vision. In some embodiments, an image capture device 1334 may include multiple cameras of any combination as described above. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for navigation (e.g. through visual inertial odometry).

UAV system 1300 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and light illuminated detection and ranging (Lidar).

UAV system 1300 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

UAV system 1300 may include one or more inertial measurement units (IMU) 1328. An IMU 1328 may measure and report the UAV's velocity, acceleration, orientation, and gravitational forces using a combination of gyroscopes and accelerometers (e.g. accelerometer 1326).

UAV system 1300 may include a global positioning system (GPS) receiver 1320. FIG. 13 shows an GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of UAV 100. In some embodiments, positioning of UAV 100 may be accomplished without GPS satellites through the use of other techniques as described herein.

In some embodiments, the software components stored in memory 1316 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 13.

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1344 and may also include various software components for handling data transmission via the network communications interface 1322. The external port 1344 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like. The graphics module in conjunction with a graphics processing unit (GPU) 1312 may process in real time or near real time, graphics data captured by optical sensor(s) 1334 and/or proximity sensors 1330.

A computer vision module, which may be a component of graphics module, provides analysis and recognition of graphics data. For example, while UAV 100 is in flight, the computer vision module along with graphics module (if separate), GPU 1312, and image capture devices(s) 1334 and/or proximity sensors 1330 may recognize and track the captured image of a subject located on the ground. The computer vision module may further communicate with a localization/navigation module and flight control module to update a relative position between UAV 100 and a point of reference, for example a target subject (e.g. a mobile device or human subject), and provide course corrections to fly along a planned flight path relative to the point of reference.

A localization/navigation module may determine the location and/or orientation of UAV 100 and provides this information for use in various modules and applications (e.g., to a flight control module in order to generate commands for use by the flight controller 1308).

Image capture devices(s) 1334 in conjunction with, image capture device controller 1332, and a graphics module, may be used to capture images (including still images and video) and store them into memory 1316.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1316 may store a subset of the modules and data structures identified above. Furthermore, memory 1316 may store additional modules and data structures not described above.

Example Computer Processing System

FIG. 14 is a block diagram illustrating at an example of a computer processing system 1400 in which at least some operations described herein can be implemented, consistent with various embodiments. Computer processing system 1400 can represent or be part of any of aforementioned devices (e.g. mobile device 104 or a general purpose computing device). Any of these systems can include two or more computer processing systems, as is represented in FIG. 14, which can be coupled to each other via a network or multiple networks.

In the illustrated embodiment, the computer processing system 1400 includes one or more processors 1410, memory 1411, one or more communications devices 1412, and one or more input/output (I/O) devices 1413, all coupled to each other through an interconnect 1414. The interconnect 1414 may be or include one or more conductive traces, buses, point-to-point connections, controllers, adapters and/or other conventional connection devices. The processor(s) 1410 may be or include, for example, one or more central processing units (CPU), graphical processing units (GPU), other general-purpose programmable microprocessors, microcontrollers, application specific integrated circuits (ASICs), programmable gate arrays, or the like, or any combination of such devices. The processor(s) 1410 control the overall operation of the computer processing system 1400. Memory 1411 may be or include one or more physical storage devices, which may be in the form of random-access memory (RAM), read-only memory (ROM) (which may be erasable and programmable), flash memory, miniature hard disk drive, or other suitable type of storage device, or any combination of such devices. Memory 1411 may be or include one or more discrete memory units or devices. Memory 1411 can store data and instructions that configure the processor(s) 1410 to execute operations in accordance with the techniques described above. The communication device 1412 represents an interface through which computing system 1400 can communicate with one or more other computing systems. Communication device 712 may be or include, for example, an Ethernet adapter, cable modem, Wi-Fi adapter, cellular transceiver, Bluetooth transceiver, or the like, or any combination thereof. Depending on the specific nature and purpose of the computer processing system 1400, the I/O device(s) 1413 can include various devices for input and output of information, e.g., a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by any combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, any computing device or system including elements similar to as described with respect to computer processing system 1400). For example, a machine-accessible medium includes recordable/non-recordable media (e.g., read-only memory (ROM); random access memory (RAM); magnetic disk storage media; optical storage media; flash memory devices; etc.), etc.

Other Remarks

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. Note that any and all of the embodiments described above can be combined with each other, except to the extent that it may be stated otherwise above or to the extent that any such embodiments might be mutually exclusive in function and/or structure.

Although the disclosed technique has been described with reference to specific exemplary embodiments, it will be recognized that the technique is not limited to the embodiments described, but can be practiced with modification and alteration within scope of the appended claims. Accordingly, the specification and drawings are to be regarded in an illustrative sense rather than a restrictive sense.

What is claimed is:

1. A method comprising:
    generating and continually updating, while in autonomous flight within a physical environment, a three-dimensional (3D) map of the physical environment based on images captured by an array of image capture devices coupled to an unmanned aerial vehicle (UAV);
    estimating a motion of both the UAV and a subject in the physical environment relative to the 3D map of the physical environment using visual inertial odometry with the images captured by the array of image capture devices; and
    in response to estimating the motions of the UAV and the subject, generating control commands to dynamically adjust image capture of the subject by a gimbaled image capture device coupled to the UAV to satisfy a specified criterion related to a quality of the image capture.

2. The method of claim 1, wherein the control commands to dynamically adjust image capture include control commands to dynamically adjust the motion of the UAV.

3. The method of claim 2, wherein the control commands to dynamically adjust the motion of the UAV include control commands configured to cause the UAV to avoid a collision with another physical object in the physical environment.

4. The method of claim 2, wherein the control commands to dynamically adjust the motion of the UAV include control commands configured to cause the UAV to fly along a continually updated flight path through the physical environment.

5. The method of claim 2, wherein the control commands to dynamically adjust the motion of the UAV include control commands to configured to cause the UAV to fly a pre-scripted flight path.

6. The method of claim 2, wherein the control commands to dynamically adjust the motion of the UAV include control commands configured to cause the UAV to fly a path of maximum energy efficiency.

7. The method of claim 1, wherein to satisfy the specified criterion, the control commands to dynamically adjust image capture are configured such that, at a given time, image capture of the subject by the UAV is not obstructed by another physical object in the physical environment.

8. The method of claim 1, wherein to satisfy the specified criterion, the control commands to dynamically adjust image capture are configured such that, at a given time, the UAV is positioned substantially between a light source and the subject so as to avoid backlighting in the captured images of the subject.

9. The method of claim 8, wherein the light source is the Sun.

10. The method of claim 1, wherein estimating the motion of the UAV and the subject is further based in part on the generated 3D map.

11. The method of claim 1, further comprising:
    identifying the subject in the physical environment by comparing captured images of the subject against stored two-dimensional (2D) and/or three-dimensional (3D) appearance models representing a neural network;

determining based on the identification of the subject and the estimated motion of the subject that the image capture of the subject is intended for a particular type of scene;

wherein, to satisfy the specified criterion, the control commands to dynamically adjust image capture are configured such that the UAV follows a pre-scripted flight path associated with the particular type of scene.

12. The method of claim 1, further comprising:
predicting a future motion of the subject based any of the estimated motion of the subject a previously estimated motion of the subject, the captured images, or a 3D map of the physical environment;
wherein the control commands to dynamically adjust image capture are further based on the predicted future motion of the subject.

13. The method of claim 1, wherein the specified criterion is based on quantified metrics associated with subjective image capture quality standards.

14. The method of claim 13, wherein the subjective image capture quality standards are based on models generated by applying machine learning to historical data.

15. The method of claim 1, wherein the control commands to dynamically adjust image capture include control commands to adjust any of focus, aperture, shutter speed, light sensitivity (ISO), frame rate, color balance, image framing, or image stabilization.

16. The method of claim 1, wherein the gimbaled image capture device utilizes a motorized gimbal.

17. The method of claim 16, wherein the motorized gimbal is a hybrid mechanical digital gimbal.

18. The method of claim 1, wherein the images captured by the image capture device include video.

19. A system comprising:
a processing unit; and
a memory unit, the memory unit having instructions stored thereon, which when executed by the processing unit cause the system to:
generate and continually update, while in autonomous flight within a physical environment, a three-dimensional (3D) map of the physical environment based on images captured by an array of image capture devices coupled to an unmanned aerial vehicle (UAV);
estimate a motion of both the UAV and a subject in the physical environment relative to the 3D map of the physical environment using visual inertial odometry with the images captured by the array of image capture devices; and
in response to estimating the motions of the UAV and the subject, generate control commands to dynamically adjust image capture of the subject by a gimbaled image capture device coupled with the UAV to satisfy a specified criterion related to a quality of the image capture.

20. An unmanned aerial vehicle (UAV) comprising:
an array of a plurality of image capture devices configured to capture images of a physical environment surrounding the UAV;
a gimbaled image capture device mounted to a hybrid mechanical digital gimbal configured to capture images of a subject in the physical environment;
a processing unit communicatively coupled to the array of the plurality of image capture devices and the gimbaled image capture device; and
a memory unit having instructions stored thereon, which when executed by the processing unit, cause the processing unit to:
generating and continually updating, while in autonomous flight within the physical environment, a three-dimensional (3D) map of the physical environment based on the captured images of the physical environment by the array of image capture devices;
estimate a motion of both the UAV and the subject in the physical environment relative to the 3D map using visual inertial odometry based on the captured images of the physical environment;
in response to estimating the motions of the UAV and the subject, generate control commands to dynamically adjust image capture of the subject by the gimbaled image capture device to satisfy a specified criterion related to a quality of the image capture.

* * * * *